US012792482B2

(12) United States Patent
Ranganathan et al.

(10) Patent No.: US 12,792,482 B2
(45) Date of Patent: Nov. 10, 2026

(54) TESTING SYSTEMS AND METHODS WITH CROSS-PLATFORM BRIDGE COMPONENTS

(71) Applicant: Advantest Test Solutions, Inc., San Jose, CA (US)

(72) Inventors: Karthik Ranganathan, San Jose, CA (US); Amey Subhedar, San Jose, CA (US); Dinesh Doshi, San Jose, CA (US); Calvin Fang, San Jose, CA (US); Michael Song, San Jose, CA (US)

(73) Assignee: Advantest Test Solutions, Inc., San Jose, CA (US)

( * ) Notice: Subject to any disclaimer, the term of this patent is extended or adjusted under 35 U.S.C. 154(b) by 0 days.

(21) Appl. No.: 18/673,796

(22) Filed: May 24, 2024

(65) Prior Publication Data

US 2025/0363023 A1 Nov. 27, 2025

(51) Int. Cl.
*G06F 11/22* (2006.01)
*G06F 11/26* (2006.01)

(52) U.S. Cl.
CPC .......... *G06F 11/2273* (2013.01); *G06F 11/26* (2013.01)

(58) Field of Classification Search
CPC .... G06F 11/26; G06F 11/273; G06F 11/2273; G06F 11/2733
See application file for complete search history.

(56) References Cited

U.S. PATENT DOCUMENTS 6,654,913 B1 * 11/2003 Minikel ................ G06F 11/221 714/E11.161
6,732,053 B1 * 5/2004 Aragona .......... G01R 31/31903 702/108

(Continued)

FOREIGN PATENT DOCUMENTS

CN 114264980 A 4/2022
CN 114374631 A 4/2022

(Continued)

OTHER PUBLICATIONS

Choosing Rack Type, Size and Power Distribution Unit by National Instruments historical version retrieved by the WayBack Machine Aug. 31, 2018 https://web.archive.org/web/20180831104205/https://download.ni.com/evaluation/ate/choosing_rack_type_size_and_power_distribution_unit.pdf (Year: 2018).*

(Continued)

*Primary Examiner* — Joseph O Schell

(57) ABSTRACT

A bridging component is implemented as a computing unit that includes a first communications interface, a second communications interface, and a processor. The computing unit can receive, from one or more external systems that are communicatively coupled to the computing unit, test programs for testing DUTs that are communicatively coupled to the computing unit. The computing unit can also transmit commands for executing the test programs to the DUTs, can receive test results from the DUTs, and can transmit test results to the appropriate external system(s). Furthermore, the computing unit can determine, for each set of one or more of the DUTs, a respective type of DUTs in the set, associate a respective test program with the set, and issue commands for executing the respective test program to the DUT(s) in the set using an operating system that is compatible with the respective type of DUT(s) in the set.

17 Claims, 13 Drawing Sheets

(56) References Cited

U.S. PATENT DOCUMENTS

| | | | | |
|---|---|---|---|---|
| 8,959,000 | B2 * | 2/2015 | Kumar | G06F 11/263 702/119 |
| 10,161,993 | B2 | 12/2018 | Frediani et al. | |
| 10,162,007 | B2 | 12/2018 | Chan et al. | |
| 10,491,314 | B2 | 11/2019 | Diperna et al. | |
| 11,143,697 | B2 | 10/2021 | Wolff | |
| 11,841,392 | B2 | 12/2023 | Ranganathan et al. | |
| 2002/0162059 | A1 | 10/2002 | McNeely et al. | |
| 2006/0077100 | A1 * | 4/2006 | Dahms | G06F 11/3698 714/E11.207 |
| 2007/0106993 | A1 | 5/2007 | Largmam et al. | |
| 2007/0244663 | A1 * | 10/2007 | Haemel | G06F 11/3688 702/182 |
| 2008/0201610 | A1 * | 8/2008 | Chen | G06F 11/2284 714/36 |
| 2009/0119542 | A1 | 5/2009 | Nagashima et al. | |
| 2009/0307763 | A1 * | 12/2009 | Rawlins | G06F 11/2294 714/E11.002 |
| 2010/0082283 | A1 | 4/2010 | Lin et al. | |
| 2013/0158934 | A1 | 6/2013 | Lee et al. | |
| 2013/0231885 | A1 * | 9/2013 | Sugimura | G06F 11/2733 702/119 |
| 2014/0236524 | A1 | 8/2014 | Frediani et al. | |
| 2014/0277922 | A1 * | 9/2014 | Chinnadurai | G07C 5/0808 701/33.2 |
| 2015/0278076 | A1 | 10/2015 | Bs et al. | |
| 2015/0316450 | A1 | 11/2015 | Nguyen | |
| 2017/0115370 | A1 | 4/2017 | Chang et al. | |
| 2017/0212164 | A1 * | 7/2017 | Caradonna | G01R 31/31905 |
| 2017/0279945 | A1 | 9/2017 | Parsons et al. | |
| 2018/0151003 | A1 | 5/2018 | Grobler et al. | |
| 2019/0378590 | A1 | 12/2019 | Joo et al. | |
| 2021/0011824 | A1 | 1/2021 | Parsons et al. | |
| 2021/0278458 | A1 | 9/2021 | Su et al. | |
| 2022/0252662 | A1 | 8/2022 | Gaoiran | |
| 2022/0382668 | A1 | 12/2022 | Malisic et al. | |
| 2024/0176721 | A1 * | 5/2024 | Yuan | G06F 11/3476 |
| 2024/0193059 | A1 * | 6/2024 | Gunter | G06F 8/61 |

FOREIGN PATENT DOCUMENTS

| | | | |
|---|---|---|---|
| CN | 114428208 | A | 5/2022 |
| CN | 111426935 | B | 7/2022 |
| CN | 1163184442 | A | 6/2023 |
| TW | 202011191 | A | 9/2018 |
| TW | 202212851 | A | 4/2022 |
| TW | 202229906 | A | 8/2022 |
| TW | I803012 | B | 5/2023 |
| TW | 202413975 | A | 4/2024 |
| WO | 2021023372 | A1 | 2/2021 |

OTHER PUBLICATIONS

Unknown Author; ATS 7038 System Level Test (SLT) Platform. Source:https://www.advantest.com/products/system-level-test-systems/ats-7038.html#:~:text=The%20ATS%207038%20is%20a,%2C%20high%20test%2Dtime%20products. Date Unknown.

Appello; et al. System-Level Test: State of the Art and Challenges. Source: https://ieeexplore.ieee.org/abstract/document/9486708. Publication Date: Jul. 26, 2021.

* cited by examiner

TESTING SYSTEMS AND METHODS WITH CROSS-PLATFORM BRIDGE COMPONENTS

RELATED U.S. APPLICATION

This application is related to the co-pending application titled "Testing Systems and Methods with Cross-Platform Bridge Components," by K. Ranganathan et al., U.S. application Ser. No. 18/674,286, filed May 24, 2024, incorporated herein by reference in its entirety.

BACKGROUND

End-user electronic devices are typically tested to confirm the performance and functionality of the devices. The devices can be tested using a large variety of test cases, and the results of the test cases are compared to expected output results. When the results of a test do not match the expected results for a device under test (DUT), the DUT can be classified as a failed device or outlier, or the DUT can be binned based on its performance, for example. By removing defective or otherwise unsatisfactory devices at the engineering and manufacturing stages, the yield of quality devices can be significantly improved.

A device under test (DUT) can include any type of end-user electronic device, such as but not limited to a computer system or smartphone, or a Universal Serial Bus-connected gadget or Peripheral Component Interconnect Express-connected gadget (e.g., an electronic device designed to perform a task), or it can be a wafer or component that is intended to be integrated into such a device. DUTs are usually tested by an automated test equipment (ATE) system, which may be used to conduct complex testing using software and automation to improve the efficiency of testing.

A limitation of conventional testing is that it is performed using a testing system (an end-device "tester ecosystem" or "vendor ecosystem") that is specialized according to the type of DUT. Thus, if a different type of DUT is to be tested, it is necessary to change the tester ecosystem to make it suitable for the new DUT. More specifically, different types of DUTs may require different hardware and/or software for testing. For example, one type of DUT may require a particular hardware interface for communicating with the testing system (e.g., over Universal Serial Bus) and/or a particular operating system (e.g., a Linux® operating system) for running tests, while another type of DUT may require a different hardware interface (e.g., Peripheral Component Interconnect Express or Ethernet) and/or a different operating system (e.g., a Windows® operating system). Changing the hardware and/or software required for testing can increase the amount of time needed for setting up tests and also increases costs.

Moreover, different types of DUTs can have different form factors (e.g., different sizes and/or shapes), which can be problematic for conventional testing systems. For example, DUTs are placed in a test interface board (TIB) for testing, and conventional testing systems use TIBs that have a structure that fits a particular form factor. Consequently, if DUTs with a different form factor are to be introduced to the testing system, then a different TIB that is designed to accommodate the different form factor has to be swapped into the testing system. This too can increase both the amount of time needed for setting up tests and test costs.

In addition, different types of tests may require different types of hardware-based connections with the DUTs. For example, one type of functional test may require one type of connection (e.g., WiFi) while another type of functional test may require Bluetooth®.

The number and variety of tests (e.g., system-level testing [SLT], burn-in testing, functional testing, and scan testing), the other factors mentioned above (e.g., the different types of DUTs, the different hardware interfaces, the different operating systems), as well as the particular requirements of a specialized tester ecosystem, require complex two-way communication between the test system and the hardware, "bare metal," and firmware of DUTs. Furthermore, most of those communications are conventionally managed by individual, isolated, and discrete software and hardware components, which is problematic for several reasons. Separate components often lead to integration difficulties. Ensuring seamless communication between disparate systems can be complex and time-consuming, requiring extensive custom development and continuous maintenance. When each component operates in isolation, there is a lack of coordination that can lead to inefficiencies. For example, repetitive tasks may be executed, or data might need to be manually transferred between systems, slowing down the overall testing process. Also, disjointed components make it difficult to debug an overall system in functional use cases. Disjointed systems can introduce more points of failure, as data inconsistencies and communication errors become more likely when information is passed between multiple standalone systems. As testing requirements evolve and the number of DUTs increases, scaling up an ecosystem of isolated components becomes challenging. Each new requirement or addition might necessitate further custom integration work, making it harder to adapt to changing needs. Maintaining multiple independent systems can also be costly.

SUMMARY

Embodiments according to the present invention overcome the above problems and obstacles by introducing a testing system that includes a bridging component that acts as an overall test orchestrator and performs various operations and functions across multiple and different platforms and multiple and different types of DUTs (devices under test). Embodiments according to the present invention also introduce test assemblies that incorporate the bridging component, and methods used by or with the bridging component and those test assemblies and test systems.

In general, a vendor ecosystem (testing system) in embodiments according to the present invention includes a test assembly that includes a number of power distribution boards (PDBs) and a number of test interface boards (TIBs). The PDBs and TIBs can be installed in a test rack. The DUTs are connected to (e.g., mounted on) one or more TIBs, and the PDBs control power to the TIBs among other functions described further herein. End-user electronic devices that can be tested (the DUTs) can be practically any type of device, such as but not limited to phones (e.g., smartphones), laptops, tablets, workstations, controllers (e.g., gaming controllers), watches, central processing units (CPUs), graphics processing units (GPUs), sensors, sensor input boards (SIBs), and gadgets (e.g., Universal Serial Bus-connected gadgets and Peripheral Component Interconnect Express-connected gadgets). The DUTs can also be individual components of such devices.

Embodiments according to the present invention introduce a "cross-platform bridge" into the vendor ecosystem (testing system). The cross-platform bridge connects client ecosystems with a vendor ecosystem for testing devices (e.g., full form factor end-user devices). The cross-platform bridge allows seamless two-way communication between the client and vendor ecosystems and is "hardware-agnostic." The cross-platform bridge acts as an overall orchestrator, performs various functions across multiple platforms, and supports multiple DUT types and scales.

More specifically, in embodiments, the cross-platform bridge includes a number of computing units (e.g., single board computers, SBCs) on the PDBs. Each computing unit/SBC can be connected to any practical number of DUTs, including different types of DUTs, on one more TIBs. The cross-platform bridge can determine the types of the DUTs and their respective locations on the TIB. The cross-platform bridge can execute a respective test program on each set of the same type of DUTs with software platforms (e.g., operating systems) compatible with the DUT type, receive results of the testing, and provide the results to the client ecosystem. The test programs can include system-level tests, functional tests, and scan tests.

In embodiments, the bridging component (cross-platform bridge) is implemented as a computing unit that includes a first communications interface, a second communications interface, and a processor. The computing unit can receive, from one or more external systems (e.g., a client system or an intermediary device such as a proxy server) that are communicatively coupled to the computing unit, test programs for testing one or more DUTs that are communicatively coupled to the computing unit. The computing unit can also transmit commands for executing the test programs to the DUT(s), can receive test results from the DUT(s), and can transmit test results to the appropriate external system(s). Furthermore, the computing unit can determine the type of DUT for a set of one or more DUTs, determine the locations of the DUT(s) in the testing system, associate a respective test program with the DUT(s), and issue commands for executing that test program to the DUT(s) using an operating system that is compatible with the type of DUT(s).

In embodiments, a test assembly includes one or more test interface boards and one or more power distribution boards. Each test interface board includes connection interfaces. Each of those connection interfaces is configured for connectivity to a respective DUT. One or more computing units are coupled to each power distribution board. Each of the one or more computing units is configured for connectivity to a respective set of one or more DUTs. Each of the one or more computing units can function as a cross-platform bridge as described above, and so can determine the type of the DUT(s) in the respective set, determine the locations in the test assembly of the DUT(s) in the respective set, select an operating system that is compatible with the type of the DUT(s) in the respective set, and execute a test program on each DUT in the respective set using the operating system.

In embodiments, a testing system includes a test assembly like that described above. The testing system also includes an intermediary device (e.g., a proxy server) that provides remote access to the computing unit(s). Each of the one or more computing units is configured for connectivity to a respective set of one or more DUTs associated with a respective client system and can function as a cross-platform bridge as described above. That is, each of the one or more computing units can execute multiple operating systems, identify locations on the one or more test interface boards of each DUT of the respective set of DUTs, determine the type of the DUT(s) in the respective set, receive a respective test program from a client system via the intermediary device, execute the test program using an operating system that is compatible with the type of DUT in the respective set of DUTs, and transmit test results to the client system via the intermediary device.

Embodiments according to the present invention also introduce methods (e.g., software) used by or with the bridging component, test assemblies, and testing systems.

In method embodiments, a computing unit (e.g., an SBC) receives a test program from an external system (e.g., a client system or an intermediary device such as a proxy server). The test program is for testing DUTs that are communicatively coupled to the computing unit and on one or more TIBs. The TIBs are configured for connectivity to different types of devices having different form factors. The computing determines the type of the DUT(s) and a respective location on the TIB(s) of each of the DUT(s). The computing unit selects an operating system that is compatible with the type of the DUT(s) from a number of operating systems residing on and executable by the computing unit. The computing unit issues commands for executing the test program to each DUT using the selected operating system, and the test program is executed. The computing unit receives results of the testing and transmits the results of the testing to the external system.

In method embodiments, a computing unit detects connections between DUT(s) and one or more test interface boards (e.g., the TIBs 131 and 132) in a test rack. The DUTs in the test rack can include different types of devices having different form factors. The computing unit accesses from memory a test program associated with a set of one or more of the DUTs, and maps the test program to the locations in the test rack of each DUT of the set of DUT(s). An operating system is selected from a number of operating systems residing in the memory of the computing unit, where the selected operating system is compatible with a type of device in the set of DUT(s). The test program is then executed on each DUT in the set of DUT(s), using the operating system.

In method embodiments, a number of test programs are received at computing units on a power distribution board in a test assembly of a testing system. The test programs are for testing DUTs in one or more test racks of the testing system or test assembly. Each test program includes respective commands for testing a respective set of the DUTs. A first test program is mapped to locations in the test assembly of each DUT of a first set of DUT(s), where the first set of DUT(s) is associated with the first test program and uses a first operating system. A second test program is mapped to locations in the test assembly of each DUT of a second set of DUT(s), where the second set of DUT(s) is associated with the second test program and uses a second, different operating system. The first test program is executed on each DUT in the first set of DUT(s), using the first operating system; and the second test program is executed on each DUT in the second set of DUT(s), using the second operating system. The second test program can be executed concurrently with the execution of the first test program. In an embodiment, the first test program and the second test program are executed concurrently by the same computing unit. Results of testing the first set of DUT(s) are transmitted to a first client system, and results of testing the second set of DUT(s) are transmitted to a second client system.

Thus, embodiments according to the present invention provide a cross-platform bridge (which includes a computing unit or multiple computing units) that operates as an overall test orchestrator and can perform various functions across multiple and different platforms and DUT types.

Different types of DUTs can be tested without having to reset the tester ecosystem. Furthermore, two-way communication with the hardware, bare metal (e.g., a device or computer system without a base operating system or applications), and firmware of DUTs is simplified.

Other benefits provided in embodiments of the present invention include the ability to run different types of tests such as, but not limited to, system-level tests (SLTs), functional tests, scan tests, stress testing, connectivity testing, digital tests, and debugging operations, including testing for different communication and connectivity technologies and protocols for digital circuitry and RF (radio frequency) circuitry, such as but not limited to Internet Protocol (IP), Transmission Control Protocol (TCP), Hypertext Transfer Protocol (HTTP), 4G and 5G cellular, WiFi, Bluetooth®, and near-field communication (NFC). In embodiments, the power distribution boards connected to the DUTs are discrete single board computing units that interface with respective DUTs. As such, the disclosed testing system provides a fully integrated ecosystem for automating the entire execution of any test program on the DUTs directly. The slots in the TIBs are configurable and so can support different form factors. Accordingly, the DUTs can easily be swapped out and can include any combination of devices having different form factors.

Other features, objects, and advantages of embodiments according to the present invention are provided in the following detailed description, which is illustrated in the various figures.

This summary is provided to introduce a selection of concepts that are further described below in the detailed description that follows. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification and in which like numerals depict like elements, illustrate embodiments according to the present invention and, together with the detailed description, serve to explain the principles of the disclosed invention. The drawings are not necessarily drawn to scale.

DETAILED DESCRIPTION

Reference will now be made in detail to the various embodiments of the present invention, examples of which are illustrated in the accompanying drawings. While described in conjunction with these embodiments, it will be understood that they are not intended to limit this disclosure to these embodiments. On the contrary, the disclosure is intended to cover alternatives, modifications, and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present invention may be practiced without these specific details. In other instances, well-known methods, procedures, components, and circuits have not been described in detail so as not to unnecessarily obscure aspects of the present invention.

Figure 7:
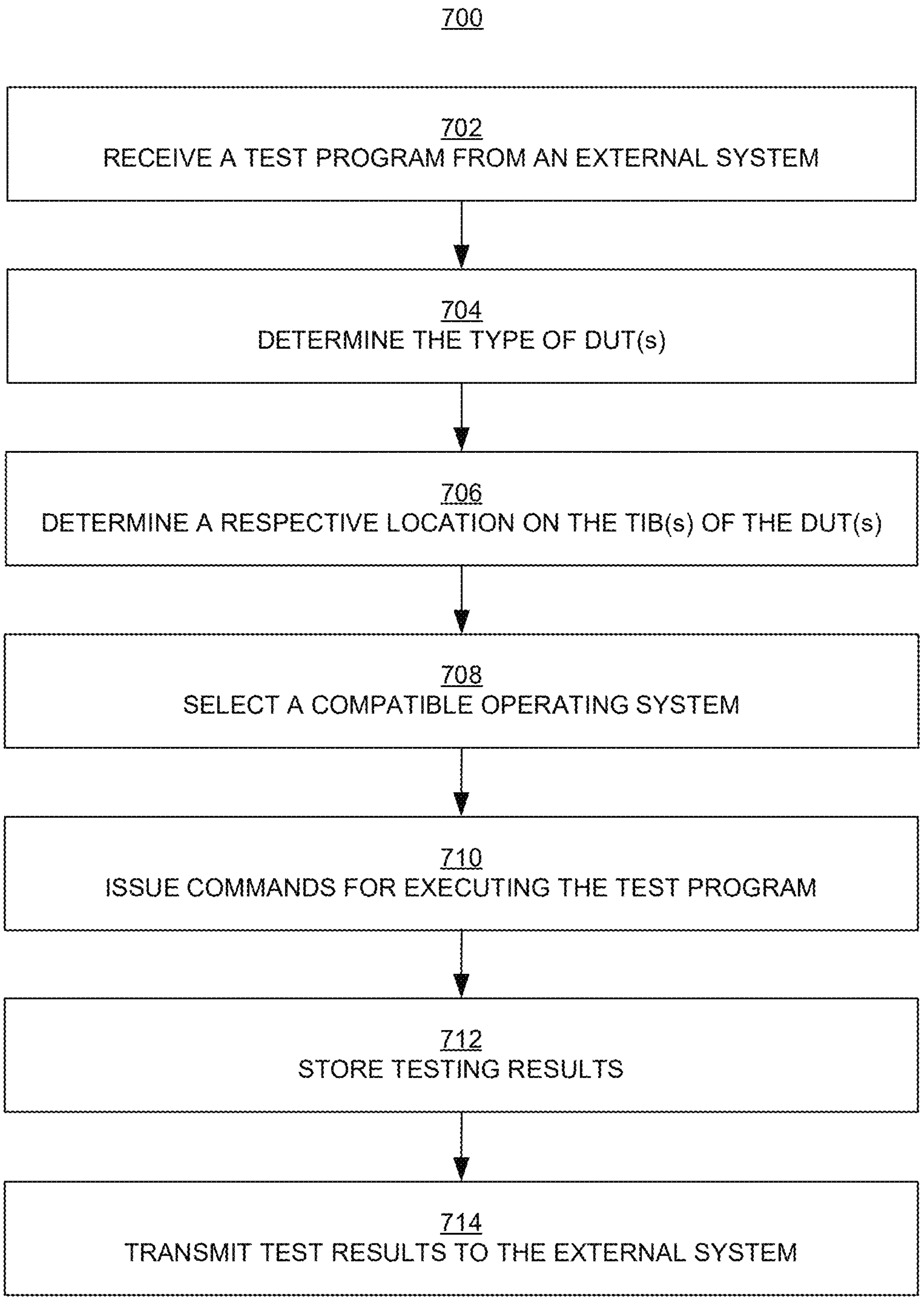
FIG. 7 is a flowchart of an example of a method performed by a computing unit in embodiments according to the present invention.
Figure 8:
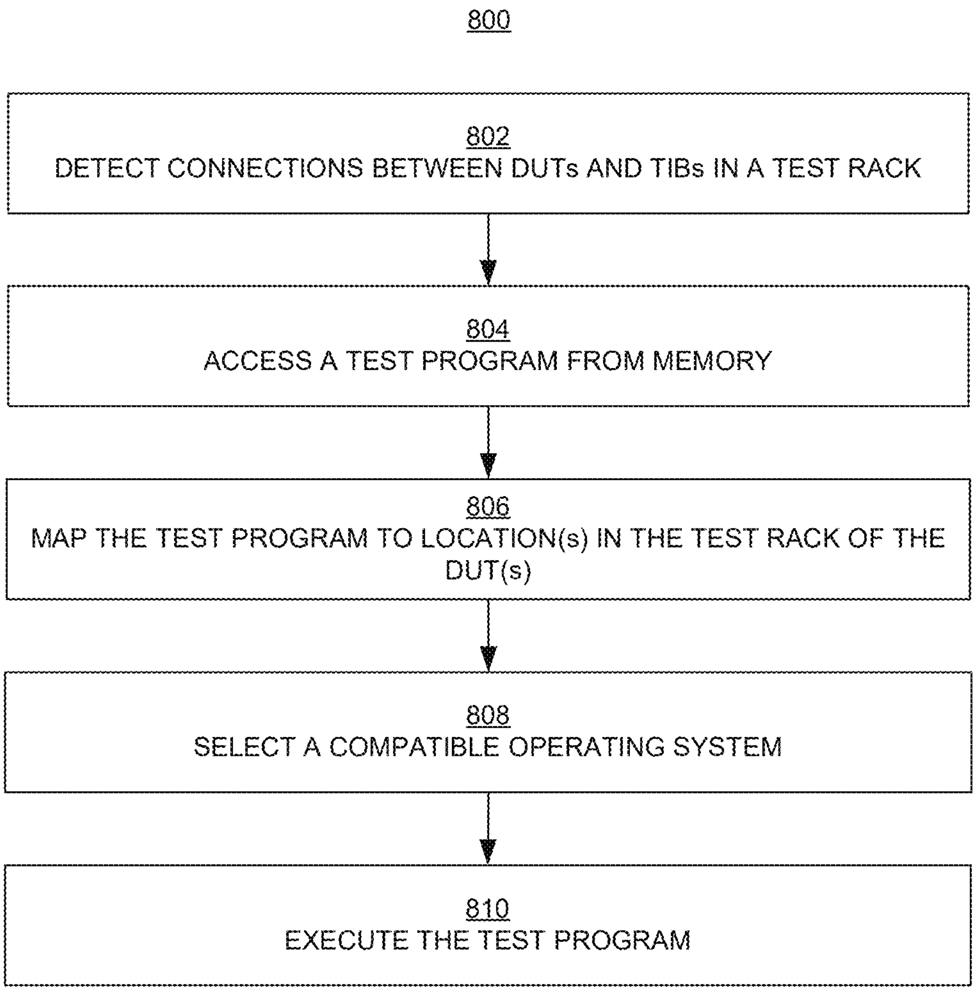
FIG. 8 is a flowchart of an example of a method performed by a computing unit in a test assembly in embodiments according to the present invention.
Figure 9:
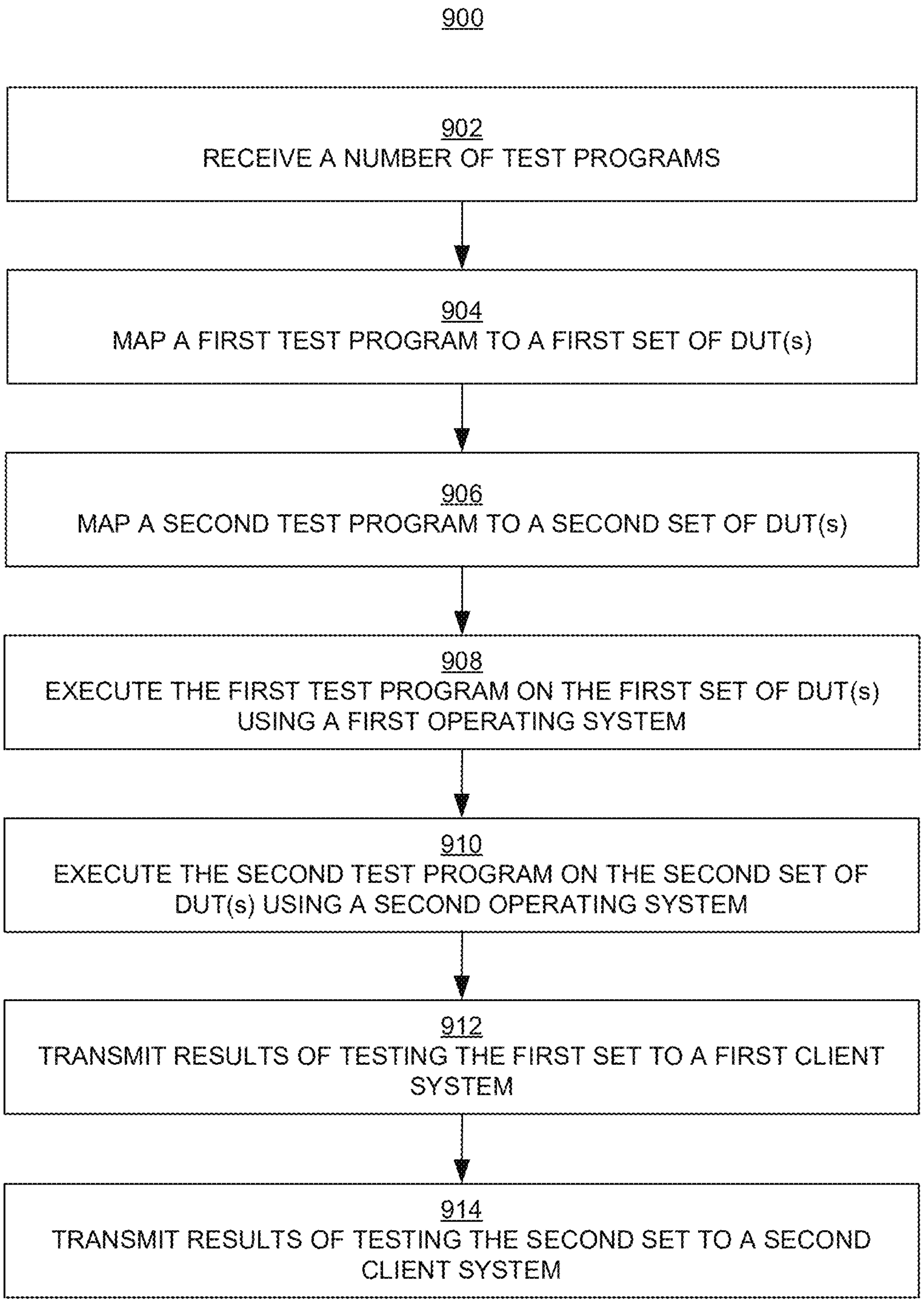
FIG. 9 is a flowchart of an example of a method performed by a testing system in embodiments according to the present invention.

Some portions of the detailed description are presented in terms of procedures, steps, logic blocks, processing, and other symbolic representations of operations on data bits that can be performed on computer memory (e.g., FIGS. 7, 8, and 9). These descriptions and representations are the means used by those skilled in the arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system or computing unit. It has proven convenient at times, principally for reasons of common usage, to refer to these signals as bits, values, elements, symbols, characters, terms, numbers, parameters, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "receiving," "determining," "selecting," "storing," "transmitting," "receiving," "downloading," "issuing," "executing," "providing," "generating," "sending," "uploading," "processing," "detecting," "accessing," "mapping," or the like, refer to the action and processes of a computer system or computing unit, or similar electronic computing device, that manipulates and transforms data represented as physical (electronic) quantities within the computer system's registers and memories into other data similarly represented as physical quantities within the computer system memories or registers or other such information storage, transmission, or display devices. The term "communicatively coupled," as used herein, indicates that elements (e.g., devices) are able to communicate with each other with a wired and/or wireless connection, directly and/or indirectly through one or more intermediate elements. The term "connectivity," as used herein, refers to the state or capability of being connected with another element (e.g., device), such as either a direct physical connection with the other device or a connection that allows communication with the other device.

Embodiments described herein may be discussed in the general context of computer-executable instructions residing on some form of computer-readable storage medium, such as program modules, executed by one or more computing units or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory, read only memory (ROM), electrically erasable programmable ROM (EEPROM), flash memory or other memory technology, compact disk ROM (CD-ROM), digital versatile disks (DVDs) or other optical or magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Testing Systems and Methods With Cross-Platform Bridge Components

In overview, embodiments according to the present invention provide a vendor ecosystem (testing system) that can run full sets of different types of tests on different types of devices under test (DUTs). The testing system includes a number of power distribution boards (PDBs) and a number of test interface boards (TIBs). The PDBs and TIBs can be installed in a test rack. The DUTs are connected to (e.g., mounted on) one or more TIBs, and the PDBs control power to the TIBs among other functions described further below. The DUTs can be practically any type of device and can have different form factors. The DUTs can also be individual components of such devices.

Embodiments according to the present invention include testing systems that include a novel computing unit (which may be referred to herein as a "cross-platform bridge") that connects client ecosystems with a vendor ecosystem for testing devices ("devices under test") (e.g., full form factor end-user devices). The cross-platform bridge can be mounted on a PDB, allows seamless two-way communication between the client and vendor ecosystems, and is "hardware-agnostic" (e.g., designed to operate properly on and with different, perhaps any, platform or device, regardless of the specific hardware used by the platform or device).

More specifically, in embodiments, the cross-platform bridge includes a number of (one or more) computing units (e.g., single board computers) that can be connected to any practical number of DUTs, including different types of DUTs, on one or more TIBs. The DUTs can be any type of device, such as but not limited to phones (e.g., smartphones), laptops, tablets, workstations, controllers (e.g., gaming controllers), watches, central processing units (CPUs), graphics processing units (GPUs), sensors, sensor input boards (SIBs), and gadgets (e.g., Universal Serial Bus-connected gadgets and Peripheral Component Interconnect Express-connected gadgets). The DUTs can also be individual components of such devices.

The cross-platform bridge acts as an overall orchestrator of the testing and communication, performs various functions across multiple and different platforms, provides execution context for the testing, provides device isolation, specifies parameters such as voltage and current levels for testing components of the DUTs, and supports multiple and different types of DUTs and different scales (e.g., different numbers of DUTs). The cross-platform bridge can determine the types of the DUTs and their respective locations on the TIB(s). The cross-platform bridge can execute a respective test program on each set of the same type of DUTs with a software platform (e.g., operating system) that is compatible with the DUT type, receive results of the testing, store the results, post-process the results, package results from the same type of DUTs, and provide the results to the client ecosystem. The test programs can include, for example, system-level tests (SLTs), functional tests, scan tests (e.g., over USB [Universal Serial Bus], PCIe [Peripheral Component Interconnect Express], or JTAG [Joint Test Action Group]), stress testing, connectivity testing, digital tests, and debugging operations, including testing for different communication and connectivity technologies and protocols for digital circuitry and RF (radio frequency) circuitry (such as but not limited to IP, TCP, HTTP, 4G and 5G cellular, WiFi, Bluetooth®, and NFC). The cross-platform bridge can also perform functions such as, but not limited to, run binaries in the native operating system (e.g., the operating system used by the DUTs), run characterization tests, run debug tests, run production tests, and determine the minimum voltage a DUT can operate on.

Thus, the disclosed testing system provides a fully integrated ecosystem for automating the entire execution of any test program directly on the DUTs.

Figure 1:
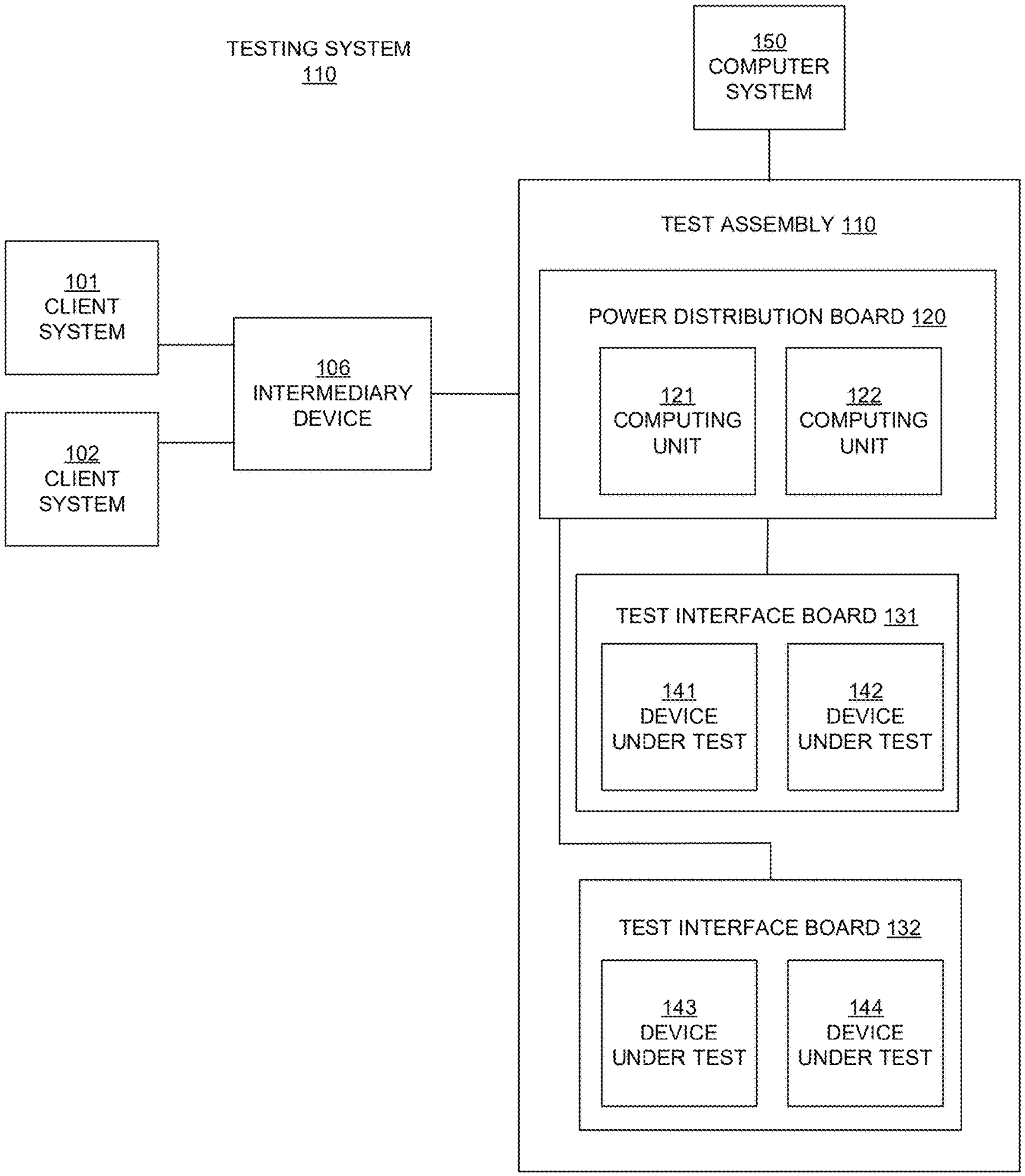
FIG. 1 is a block diagram showing selected elements of a testing system in embodiments according to the present invention.

FIG. 1 is a block diagram showing selected elements of a testing system 100 in embodiments according to the present invention. The testing system 100 may include elements other than those shown and described, and it may also include different numbers of the elements shown and described.

In the embodiments of FIG. 1, the testing system 100 includes what may be referred to herein as a client (or customer) ecosystem and a vendor (or tester) ecosystem. For example, the client ecosystem may include the client systems 101 and 102, and the vendor ecosystem may include the intermediary device 106 and the test assembly 110.

Generally speaking, the client system 101 includes a computer system or network of computer systems that belong to a client entity that, in some manner, has a proprietary or similar interest in the DUTs. The client system 102 is a similar type of system or network. The client systems 101 and 102 can communicate with the testing system 100 via the intermediary device 106. For example, the client systems 101 and 102 can provide respective test programs to the testing system 100 via the intermediary device 106. This allows clients to write their own custom commands and test programs for their respective DUTs. Also, the client systems 101 and 102 can receive, from the testing system 100 via the intermediary device 106, the results of testing their respective DUTs. Furthermore, the client systems 101 and 102 can be used for remote participation in and/or management of the testing of their respective DUTs. For example, the client systems 101 and 102 can analyze the test results for their respective DUTs, and use those results of the analysis as feedback for the next stage of testing. Accordingly, testing can be made available to computer systems located anywhere in the world, and remote entities can perform testing as if they have physical access to the testing equipment.

In an embodiment, the intermediary device 106 is a proxy server. The client systems 101 and 102 can remotely access and log into the intermediary device 106 with, for example, an IP address and some form of authentication (e.g., a password), and in turn the intermediary device forwards that remote login and permits secure access to a private network that includes the portion of the vendor ecosystem that is downstream of the intermediary device. Thus, the client systems 101 and 102 can be anywhere in the world that has Internet access. In an embodiment, the intermediary device 106 is implemented using a rack-integrated computer system (RIC); however, the invention is not so limited.

In the FIG. 1 embodiments, the test assembly 110 includes a number of PDBs and a number of TIBs. The TIBs and PDBs can be installed in a test rack (e.g., see FIGS. 6A and 6B). In the example of FIG. 1, the test assembly 110 includes a PDB 120 and TIBs 131 and 132. The PDB 120 controls power to the TIBs 131 and 132. Here, and in the discussion to follow, the test assembly 110 may include any practical number of the described hardware elements. That is, for example, embodiments according to the present invention may include more than one PDB, more or less than two TIBs, more or less than four DUTs, and so on.

The PDB 120 includes a number connection interfaces that are configured for connectivity to a like number of computing units, represented by the computing units 121 and 122. For example, the computing units 121 and 122 may be plugged into sockets on the PDB 120, although the invention is not so limited.

In an embodiment, each of the computing units 121 and 122 is a single board computer (SBC). The computing units 121 and 122 are described further below in conjunction with FIG. 2. In general, the computing units 121 and 122 execute active control software that executes test programs on DUTs by sending commands to the DUTs.

Continuing with reference to the example of FIG. 1, each of the TIBs 131 and 132 includes a number of connection interfaces configured for connectivity to a respective like number of DUTs, exemplified by the DUTs 141, 142, 143, and 144. As will be described further herein, the DUTs 141-144 may have different form factors (e.g., different shapes or sizes). Accordingly, in an embodiment, the connection interfaces on the TIBs 131 and 132 can be customized or configured to accommodate different form factors (see also the discussion of FIG. 4, below). The DUTs 141-144 can be any type of device, such as but not limited to phones (e.g., smartphones), laptops, tablets, workstations, controllers (e.g., gaming controllers), watches, central processing units (CPUs), graphics processing units (GPUs), sensors, sensor input boards (SIBs), and gadgets (e.g., USB-connected gadgets and PCIe-connected gadgets). The DUTs 141-144 can also be individual components of such devices.

In an embodiment, the testing system 100 also includes or is communicatively coupled to a computer system 150. The computer system 150 may be a RIC, or it may be communicatively coupled to the test assembly 110 via, for example, a switch such as an Ethernet switch. The computer system 150 can be used as a system controller for managing the testing system 100, specifically the automated test equipment (ATE) and integrated development environments (IDEs), including coordinating testing across the SBCs and TIBs of the testing system 100.

Figure 2:
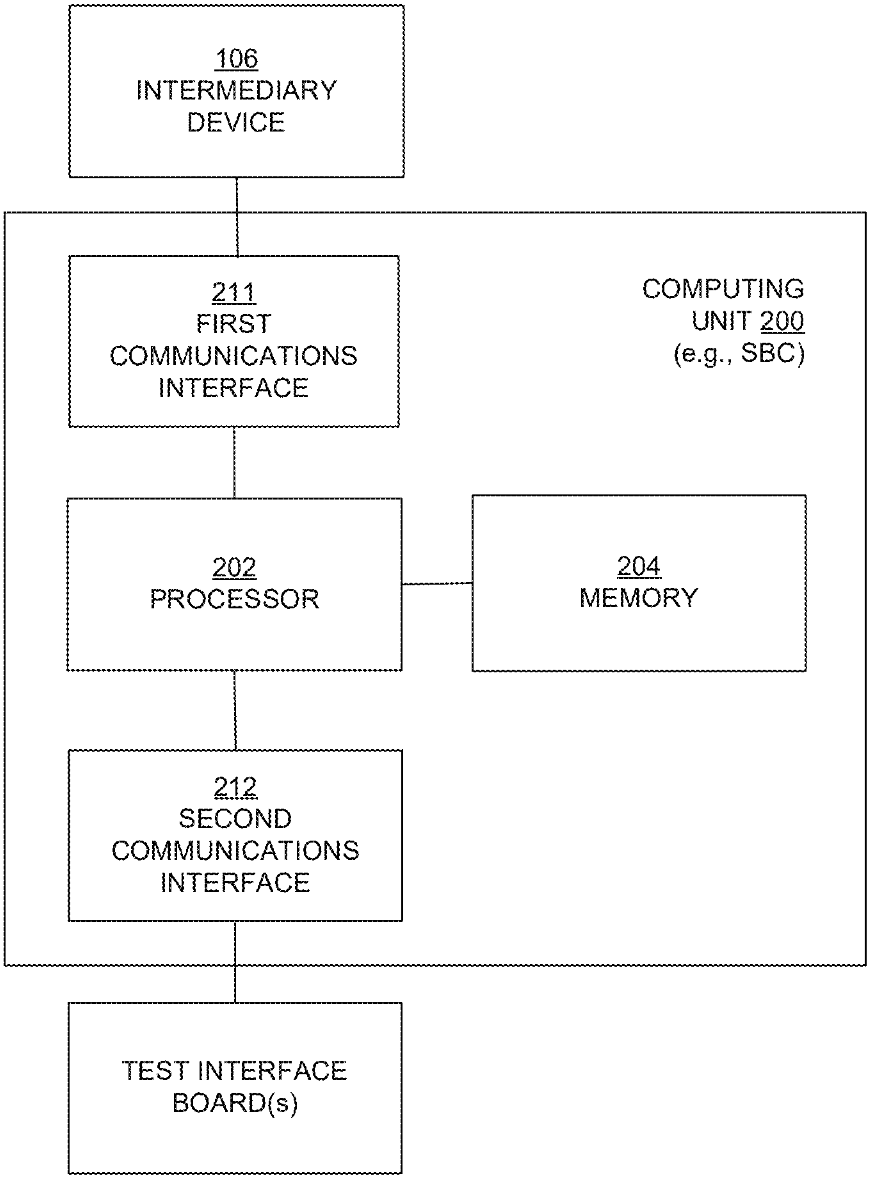
FIG. 2 is a block diagram showing selected elements of a computing unit in embodiments according to the present invention.

FIG. 2 is a block diagram showing selected elements of a computing unit 200 in embodiments according to the present invention. The computing unit 200 is an example of the computing units 121 and 122 of FIG. 1. In embodiments, the computing unit 200 is implemented as a single board computer (SBC) and includes a processor 202 and a memory 204 that is coupled to the processor. The computing unit 200 may include other components that are typical of a conventional computer system, such as a display device and a user input device; however, the computing unit/SBC can perform its functions without such elements.

The computing unit 200 of FIG. 2 also includes a first communications interface 211 that is operable for two-way communication with an external device. In embodiments, the first communications interface 211 is operable for two-way communication with the intermediary device 106. Alternatively, the first communications interface 211 can be used for direct two-way communication with a client system, bypassing the intermediary device 106. In an embodiment, the first communications interface 211 is an Ethernet driver. The first communications interface 211 can communicate to the external device via a wired connection or a wireless connection (such as WiFi, Bluetooth®, and NFC), or it may be capable of both wired and wireless communication. In an embodiment, the computing unit 200 has more than one communications interface operable for two-way communication with a second external device (e.g., the computer system 150 of FIG. 1 and/or other intermediary devices/proxy servers).

The computing unit 200 of FIG. 2 also includes a second communications interface 212 that is operable for two-way communication with the TIBs 131 and 132 (FIG. 1) in general and one or more DUTs on the TIBs in particular. For example, the second communications interface 212 can be communicatively coupled to any one of the DUTs 141-144, or to more than one of the DUTs 141-144 in any combination (refer to the examples of FIGS. 5A, 5B, 5C, and 5D below). In an embodiment, the second communications interface 212 is a USB universal connector; in another embodiment, it is an asynchronous receiver/transmitter (UART) connector; and in yet another embodiment, it is a PCIe connector. The second communications interface 212 can communicate to the DUTs 141, 142, 143, and/or 144 via a wired connection or a wireless connection, or it may be capable of both wired and wireless communication. Thus, the computing unit 200 supports either or both conductive testing and over-the-air (OTA). Multiple transmit (Tx) and receive (Rx) power levels are also supported. Furthermore, MIMO (multiple-input and multiple-output) antenna sharing is supported. Tests can be conducted on different frequency bands. In an embodiment, the computing unit 200 has more than one such communications interface so that it can communicate with more than one DUT or more than one group of DUTs at the same time (concurrently).

Due to its wired and wireless capabilities, the second communications interface 212 is capable of being used for RF, cellular, and connectivity testing on the DUTs 141, 142, 143, and/or 144. Cellular testing includes all low, medium, and high, and ultra-high frequencies (e.g., about 400 megahertz to about seven gigahertz). The computing unit 200 can therefore test, for example, 4G and 5G cellular, WiFi, Bluetooth®, NFC, and global positioning system (GPS) functions and components on the DUTs.

The computing unit 200 is operable for executing different operating systems, independently and concurrently. For example, the computing unit 200 can have different operating system environments running concurrently on the same hardware using virtualization technology or by partitioning the memory 204, although the present invention is not so limited. Operating systems that can be executed by the computing unit 200 include, but are not limited to, Linux® operating systems, Windows® operating systems, Android® operating systems, and Apple® operating systems.

A single computing unit/SBC (e.g., the computing unit 200) can communicate with and control the testing of either a single DUT or multiple DUTs. The DUTs controlled by a single SBC can be the same type of DUT or different types of DUTs. As examples, the DUTs controlled by a single SBC can use different operating systems as discussed above, or they can have different form factors, or they can have different characteristics (e.g., different operating voltages and currents), or they can be executing different test programs, or they can have different features (e.g., one DUT may have a display device, and another DUT may not), or they can have different components (e.g., different processors). Embodiments according to the present invention are not limited to these examples.

The computing unit 200 is further operable for performing other operations and functions in its role as overall test orchestrator. In embodiments, the computing unit 200 determines, prior to testing, the type of each DUT to be tested, and selects an operating system that is compatible with that type of DUT. The type of DUT is determined automatically without requiring user intervention. Some examples of device types are mentioned above.

Also, in embodiments, the computing unit 200 identifies, prior to testing, the location in the test assembly 110 (FIG. 1) of each DUT to be tested. Generally speaking, the computing unit 200 identifies and enumerates connected DUTs and builds a map of the locations of those DUTs that can be used during testing. In an embodiment, the map can be displayed on a local computer (e.g., the computer system 150) that monitors the test assembly 110 specifically or that monitors the overall testing system 100.

In embodiments, the computing unit 200 receives test programs from one or more client systems (e.g., the client systems 101 and 102 of FIG. 1). This allows clients to write their own custom commands and test programs to communicate with their particular DUTs. In an embodiment, the computing unit stores the received test programs in the memory 204. In embodiments, the computing unit 200 associates each received test program with each DUT to be tested using that test program. In embodiments, the computing unit 200 issues commands for executing the test program to each DUT that is to be tested using that test program and using the operating system that is compatible with the DUT type.

In embodiments, the computing unit 200 of FIG. 2 provides execution context for executing a test program to the set of DUTs to be tested using that test program, and also runs executable binaries (such as, but not limited to, C#, Java®, and Python®) and low-level embedded code for performing DUT functions during the testing. In embodiments, the computing unit 200 runs the binaries and low-level embedded code in the operating system used by the set of DUTs.

In embodiments, the computing unit 200 sets a respective voltage level and a respective current level for testing components of the DUTs being tested. More specifically, for example, the computing unit 200 can connect to individual components on the DUT and set appropriate voltage and current levels for testing those components.

In embodiments, the computing unit 200 receives testing results from the DUTs that were tested. In an embodiment, the computing unit 200 stores the test results. In an embodiment, the computing unit 200 post-processes the test results. In another embodiment, the computing unit 200 processes the test results while tests are being performed. In such embodiments, the computing unit 200 can thus collect data, analyze the data, and use the results of the analysis as feedback for the next stage of testing.

In embodiments, the processing performed by the computing unit 200 includes real-time processing and post-processing of test results, and can include integrating and executing a third-party framework. For example, an image of a phone being testing can be captured during testing, and an image processing algorithm (e.g., an artificial intelligence algorithm) can be deployed to transform or analyze the behavior of the phone. As another example, during functional testing of a DUT, the thermal and power profiles of the DUT can be determined and analyzed.

In embodiments, the computing unit 200 compiles test results for the set of DUTs associated with a particular client system (e.g., the client system 101 of FIG. 1) into a data package, and sends the data package to that client system via the first communications interface 211, either directly or through the intermediary device 106. In other words, if a particular type of device is being tested for a customer, then the test results for that type of device can be compiled, packaged, and transmitted to that customer by the computing unit 200.

Thus, as just described, a single computing unit/SBC (e.g., the computing unit 200) has the capability to provide seamless two-way communication between a client (or customer) ecosystem and a vendor (or tester) ecosystem. Both ecosystems can seamlessly communicate with the other without full knowledge of the details of how the other ecosystem operates. Each computing unit/SBC also has the capability to communicate with and control different types of DUTs, and thereby has the ability to test a variety of devices (e.g., different types of DUTs) at the same time without the need for a tester ecosystem that is dedicated to any one particular type of device. As such, the testing system 100 provides a fully integrated ecosystem for automating the entire execution of any test program directly on the DUTs. Consequently, each computing unit/SBC can be characterized as and referred to as a cross-platform bridge or bridging component. A group of such computing units/SBCs on a PDB can also be collectively characterized as and referred to as a cross-platform bridge or bridging component.

Figure 3:
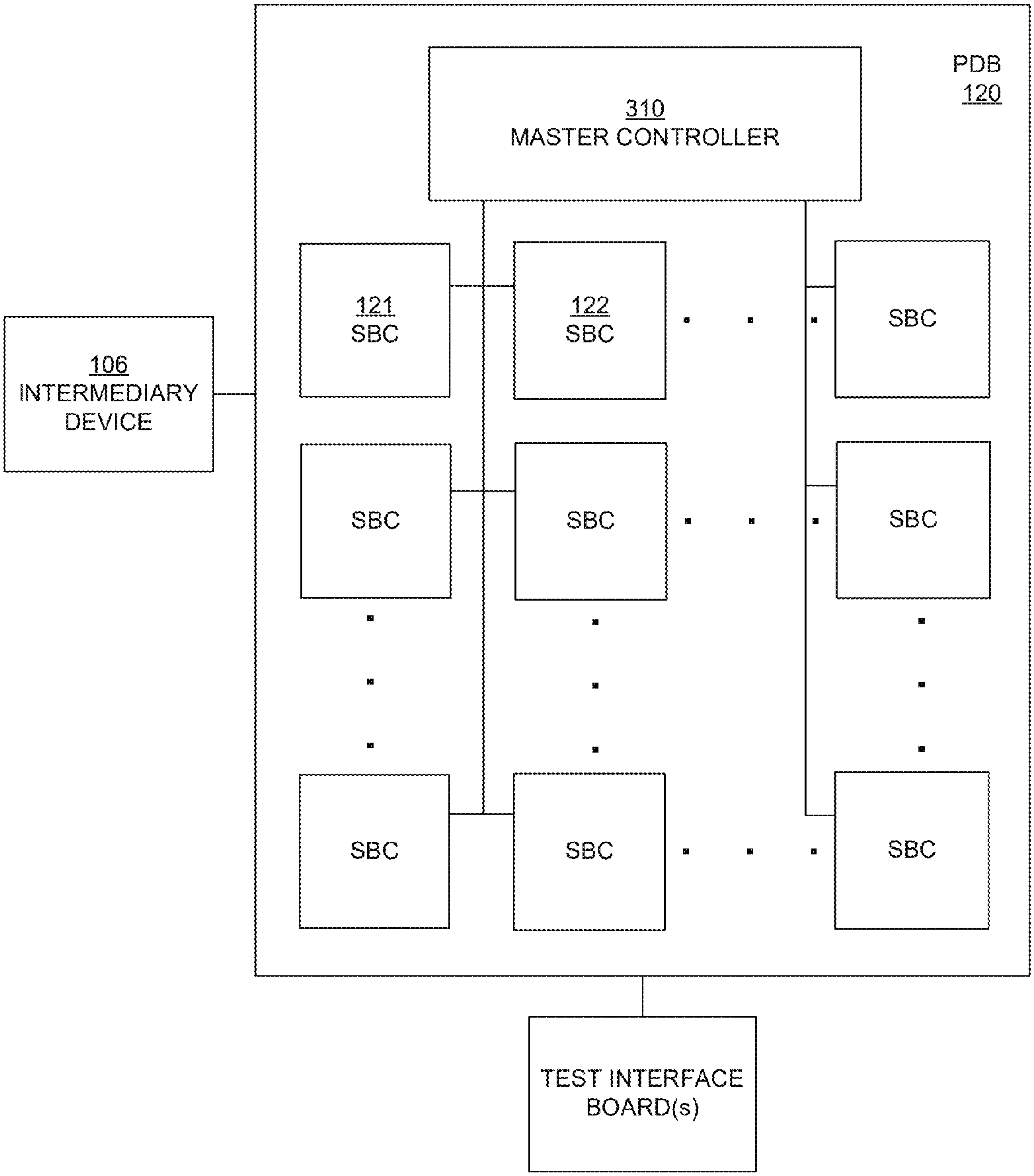
FIG. 3 is a block diagram of an example of a power distribution board in embodiments according to the present invention.

FIG. 3 is a block diagram of an example of a power distribution board (e.g., the PDB 120) in embodiments according to the present invention. The PDB 120 is connected to a number of computing units/SBCs exemplified by the SBCs 121 and 122 in the figure. In an embodiment, a master controller 310 is also connected to the PDB 120 and is communicatively coupled to the computing units/SBCs. The master controller 310 can manage and coordinate execution of a test program by multiple computing units/SBCs. For example, the computing units/SBCs 121 and 122 may operate in tandem to execute same test program, or different parts of the same test program, across a number of DUTs under control of the master controller 310.

Figure 4:
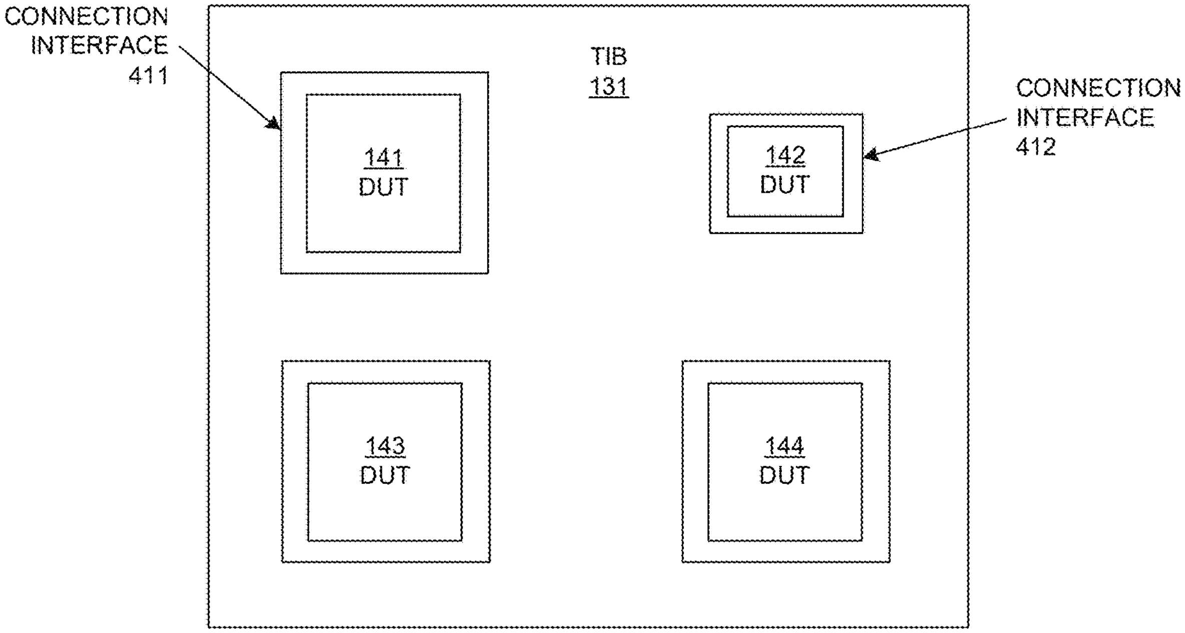
FIG. 4 is a block diagram of an example of a test interface board in embodiments according to the present invention.

FIG. 4 is a block diagram of an example of a test interface board (e.g., the TIB 131) in embodiments according to the present invention. In the example of FIG. 4, the TIB 131 includes a number of connection interfaces or slots, exemplified by the connection interfaces 411 and 412. Each connection interface is configured for connectivity to a respective DUT, exemplified by the DUTs 141 and 142. The DUTs 141 and 142 may have different form factors (e.g., different shapes or sizes).

In an embodiment, each of the connection interfaces 411 and 412 includes a mechanical insert that is sized and shaped to accommodate the form factor of the respective DUT. For example, the DUT 141 may be a smartphone and the DUT 142 may be a tablet, in which case the connection interface 411 is sized and shaped to hold a smartphone securely in place, and the connection interface 412 is sized and shaped to hold a tablet securely in shape.

In an embodiment, the connection interfaces 411 and 412 can be removed from the TIB 131, so that one connection interface can be replaced with another according to the form factor of the DUT to be tested. For example, a connection interface that is pre-sized for a particular form factor can be removed and replaced with a connection interface that is pre-sized for a different form factor.

In another embodiment, the connection interfaces 411 and 412 are reconfigurable. For example, the sides of a connection interface can be moved or otherwise adjusted to form different sizes and shapes that match the form factor of a DUT.

Thus, in embodiments, each TIB can be customized to accommodate different form factors. More specifically, in embodiments, the connection interfaces on a TIB can be customized to accommodate different form factors. Accordingly, different types of DUTs can be readily swapped in and out of a TIB, the TIB can be readily adapted to contain any type or form factor of DUT, and the TIB can also be readily adapted to accept a new type of device, a non-standard, or a prototype device having a new form factor.

Figure 5A:
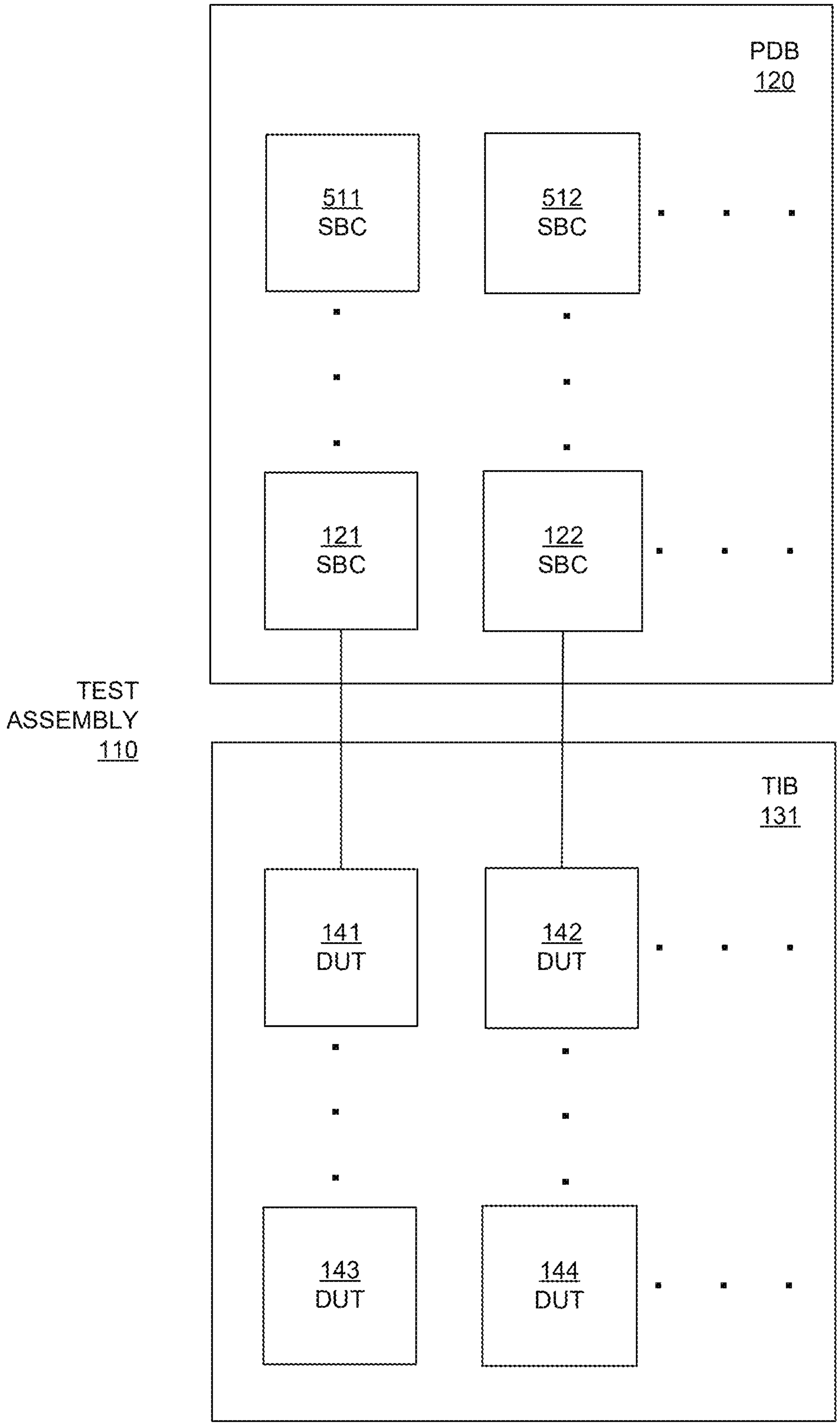
FIGS. 5A, 5B, 5C, and 5D are block diagrams showing examples of different test setups in embodiments according to the present invention.

FIG. 5A is a block diagram showing an example of a test setup in the testing system 100 (FIG. 1) or test assembly 110 in an embodiment according to the present invention. In the example of FIG. 5A and in other examples herein, the PDB 120 is shown as having four computing units/SBCs 121, 122, 511, and 512, and the TIB 131 is shown as having four DUTs 141-144; however, the present invention is not so limited, the PDBs can accommodate any practical number of computing units/SBCs, and the TIBs can accommodate any practical number of DUTs. The computing units/SBCs 511 and 512 can be connected to other DUTs (not shown).

In the example of FIG. 5A, there is a one-to-one arrangement or mapping between SBCs and DUTs. Specifically, in this example, the computing unit/SBC 121 is only connected to (communicatively coupled to) the DUT 141, and the computing unit/SBC 122 is only connected to (communicatively coupled to) the DUT 142. In this example and the other examples herein, the connection between an SBC/computing unit and a DUT can be a wired connection and/or a wireless connection.

In the example of FIG. 5A, each computing unit/SBC on the PDB 120 can be connected to a respective DUT on the TIB 131. Also, one or more computing units/SBCs on the PDB 120 can be connected to respective DUTs on one TIB, while one or more other computing units/SBCs on the PDB 120 can be connected to respective DUTs on another TIB. In general, the computing units/SBCs on the PDB 120 can be connected to respective DUTs on one or more TIBs. Thus, in this example and the examples below, the testing system 100 and test assembly 110 allow a great deal of flexibility when arranging a test setup.

Furthermore, in the example of FIG. 5A and other examples herein, testing of individual DUTs or sets of DUTs can be performed concurrently. Consequently, many DUTs can be tested in parallel. This provides a number of benefits. For example, testing system throughput is increased. Different types of devices can be tested at the same time; for example, laptops and phones can be tested independently at the same time. Also, different test programs can be performed at the same time on the same type of device. For example, a functional test can be performed on a type of phone at the same time a debugging operation is being performed on another phone of the same type.

Figure 5B:
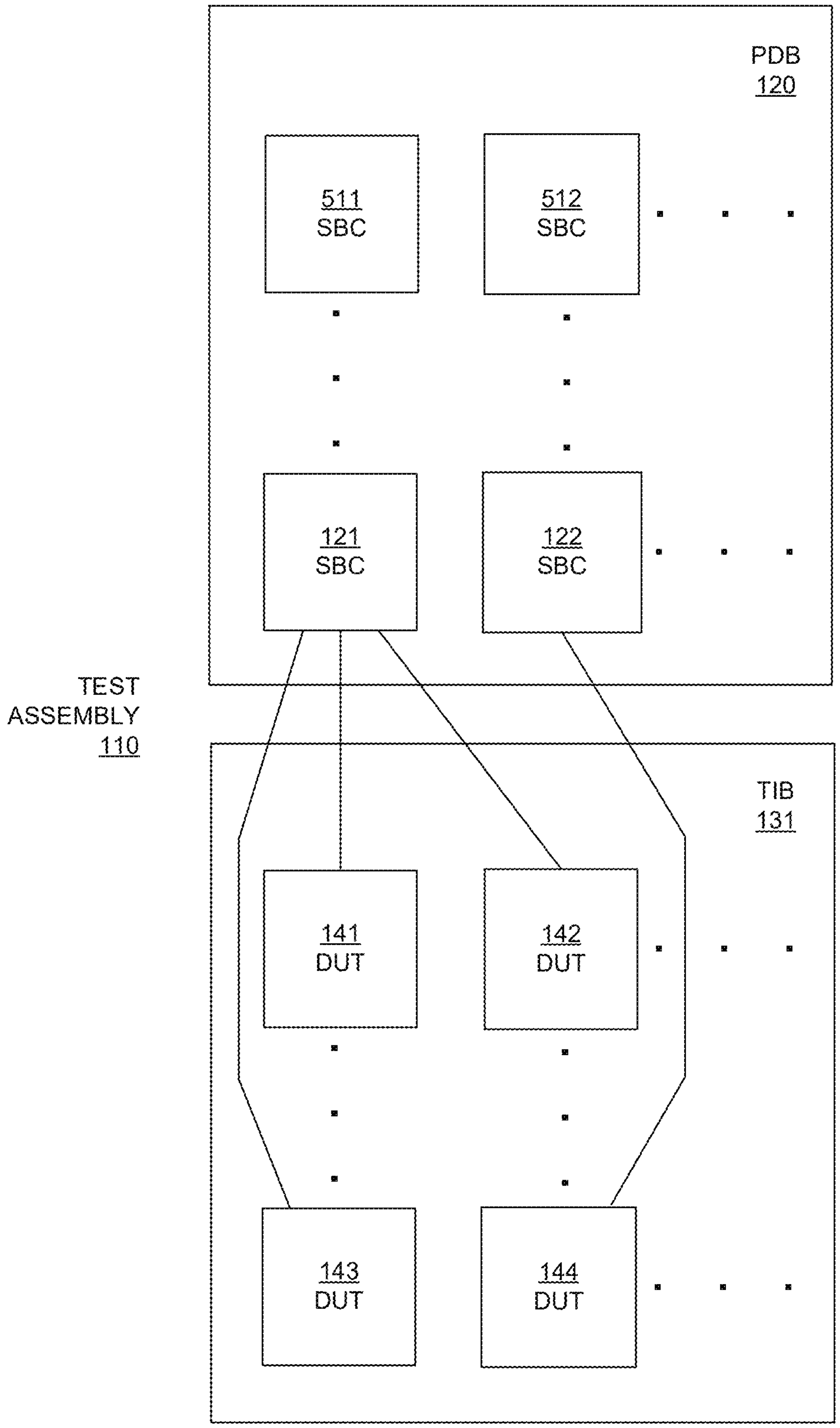

FIG. 5B is a block diagram showing another example of a test setup in the testing system 100 (FIG. 1) or test assembly 110 in an embodiment according to the present invention. In the example of FIG. 5B, there is a many-to-one (N-to-one) arrangement or mapping between SBCs and DUTs. Specifically, in this example, the computing unit/SBC 121 is connected to (communicatively coupled to) the DUTs 141-143. Although N is three in this example, the invention is not so limited; N can be any practical integer value. Other computing units/SBCs on the PDB 120 can be similarly coupled to multiple DUTs, or to a single DUT as in the example of FIG. 5A.

In an embodiment, in this example and in the following examples, when the computing unit/SBC 121 issues a command for a test, that command is automatically replicated on all N DUTs. The computing unit/SBC 121 then waits for either the test to finish on all N DUTs or for an assigned timeout. Once the test is concluded and any results are received, the computing unit/SBC 121 can package those results and transmit them to the proper client ecosystem as previously described herein.

In the example of FIG. 5B, the computing unit/SBC 121 is connected to multiple DUTs on the TIB 131. As described above, the computing unit/SBC 121 can independently and concurrently execute different operating systems, and therefore the DUTs connected to the computing unit/SBC 121 can be different types of DUTs. In general, each computing unit/SBC on the PDB 120 can be connected to one or more DUTs and one or more types of DUTs. Thus, as discussed above, the example of FIG. 5B beneficially provides flexibility when arranging a test setup.

Furthermore, while in the example of FIG. 5B all of the DUTs are shown as being on the same TIB, the invention is not so limited. That is, the DUTs coupled/connected to the computing unit/SBC 121 can be on different TIBs.

Figure 5C:
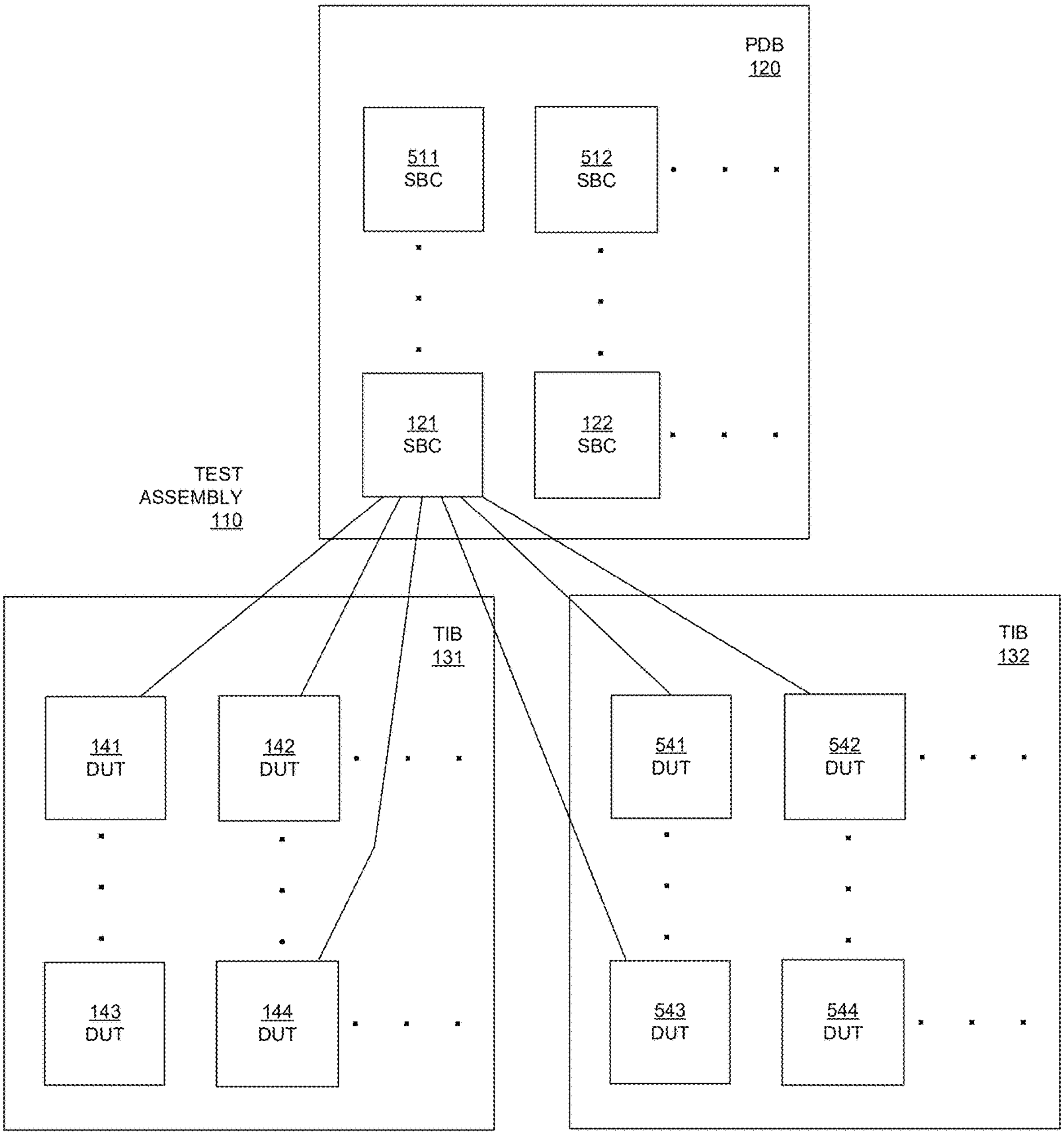

FIG. 5C is a block diagram showing yet another example of a test setup in the testing system 100 (FIG. 1) or test assembly 110 in an embodiment according to the present invention. In the example of FIG. 5C, there is a many-to-one (N-to-one) arrangement or mapping between SBCs and DUTs. Specifically, the computing unit/SBC 121 is connected to (communicatively coupled to) the DUTs 141, 142, and 144 on the TIB 131 and to the DUTs 541, 542, and 543 on the TIB 132. Although N is three in this example, the invention is not so limited; N can be any practical integer value. Other computing units/SBCs on the PDB 120 can be similarly coupled to multiple DUTs, or to a single DUT as in the example of FIG. 5A.

As in the example of FIG. 5B, the DUTs connected to the computing unit/SBC 121 can be different types of DUTs. In general, each computing unit/SBC on the PDB 120 can be connected to one or more DUTs and one or more types of DUTs on one or more TIBs. Thus, as discussed above, the example of FIG. 5C beneficially provides flexibility when arranging a test setup.

Figure 5D:
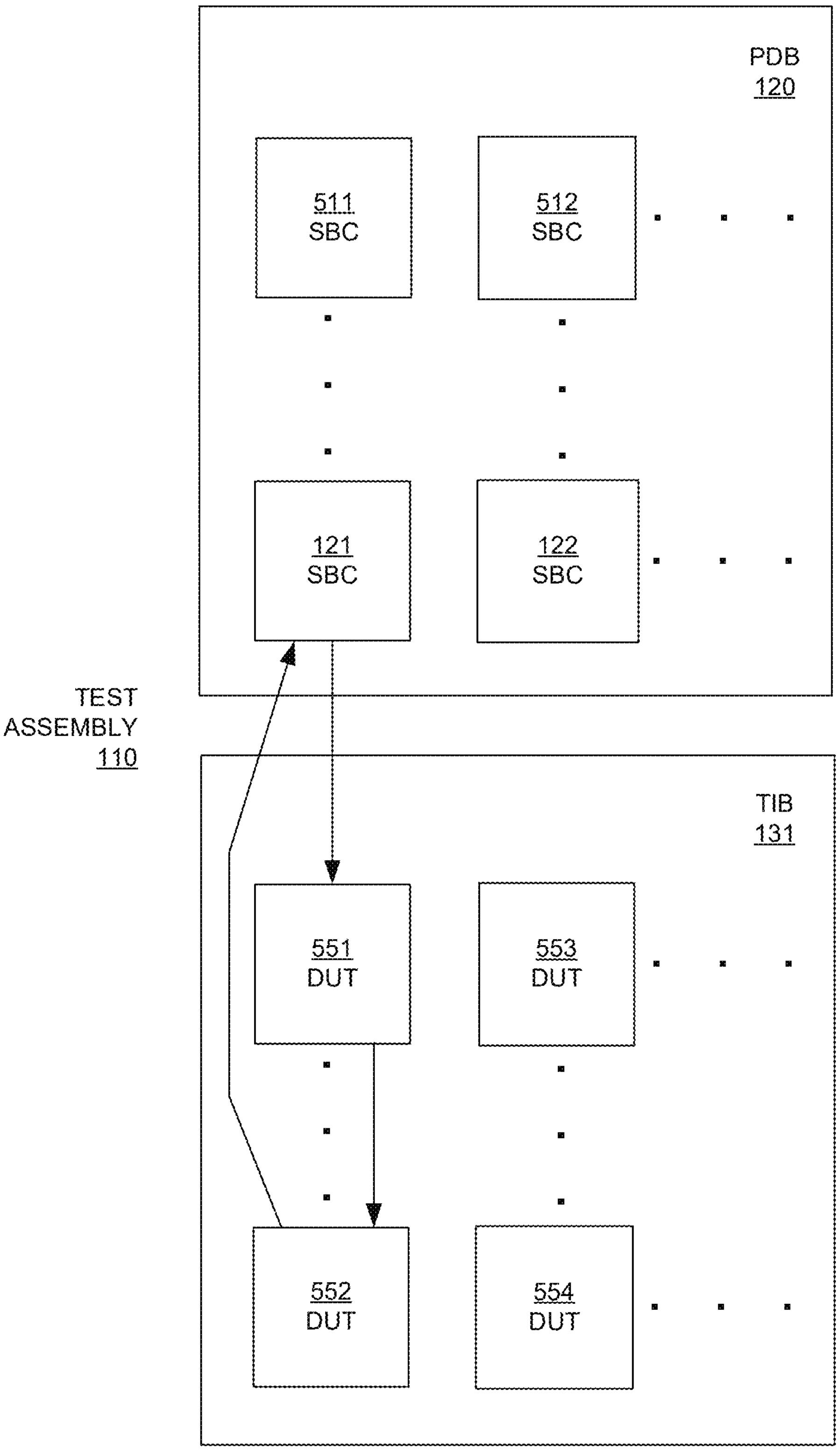

FIG. 5D is a block diagram showing yet another example of a test setup in the testing system 100 (FIG. 1) or test assembly 110 in an embodiment according to the present invention. In the example of FIG. 5D, the computing unit/SBC 121 is connected to (communicatively coupled to) the DUT 551, which in turn is connected (communicatively coupled to) the DUT 552, which is also connected to (communicatively coupled to) the computing unit/SBC 121. Such an arrangement represents a case in which the output of one DUT (e.g., the DUT 551) impacts the performance of another DUT (e.g., the DUT 552).

For example, an autonomous vehicle may be equipped with a blind-spot sensor. The output of the blind-spot sensor may be provided to a second sensor that determines whether a turn signal is activated or whether the vehicle is turning or changing lanes. If the turn signal is activated, the second sensor may react in a certain way (e.g., it may generate one type of alert, resulting in one type of vehicle response); and if the vehicle is turning or changing lanes, the second sensor may react in a different way (e.g., it may generate a second type of alert, resulting in a second type of vehicle response).

To test a scenario like the one just described, a result or output of testing the DUT 551 is sent to the DUT 552, the DUT 552 is tested based on the information received from the DUT 551, and the result or output from the DUT 552 is sent to the computing unit/SBC 121. More than two DUTs can be connected in any practical configuration to mirror the configuration of different real-world applications like the one described above. In general, the example of FIG. 5D beneficially provides flexibility when arranging a test setup.

Figure 6A:
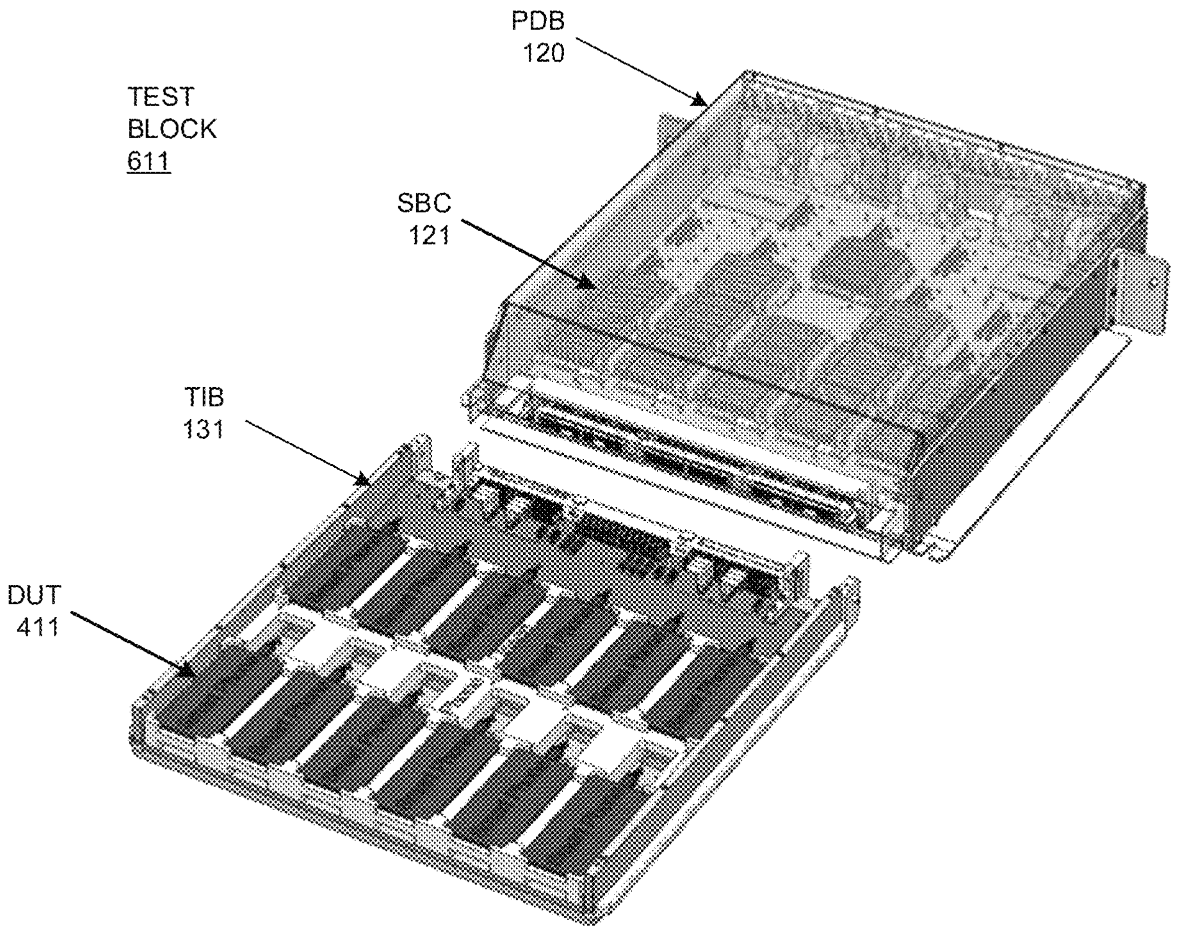
FIG. 6A illustrates an example of a power distribution board and a test interface board in embodiments according to the present invention.
Figure 6B:
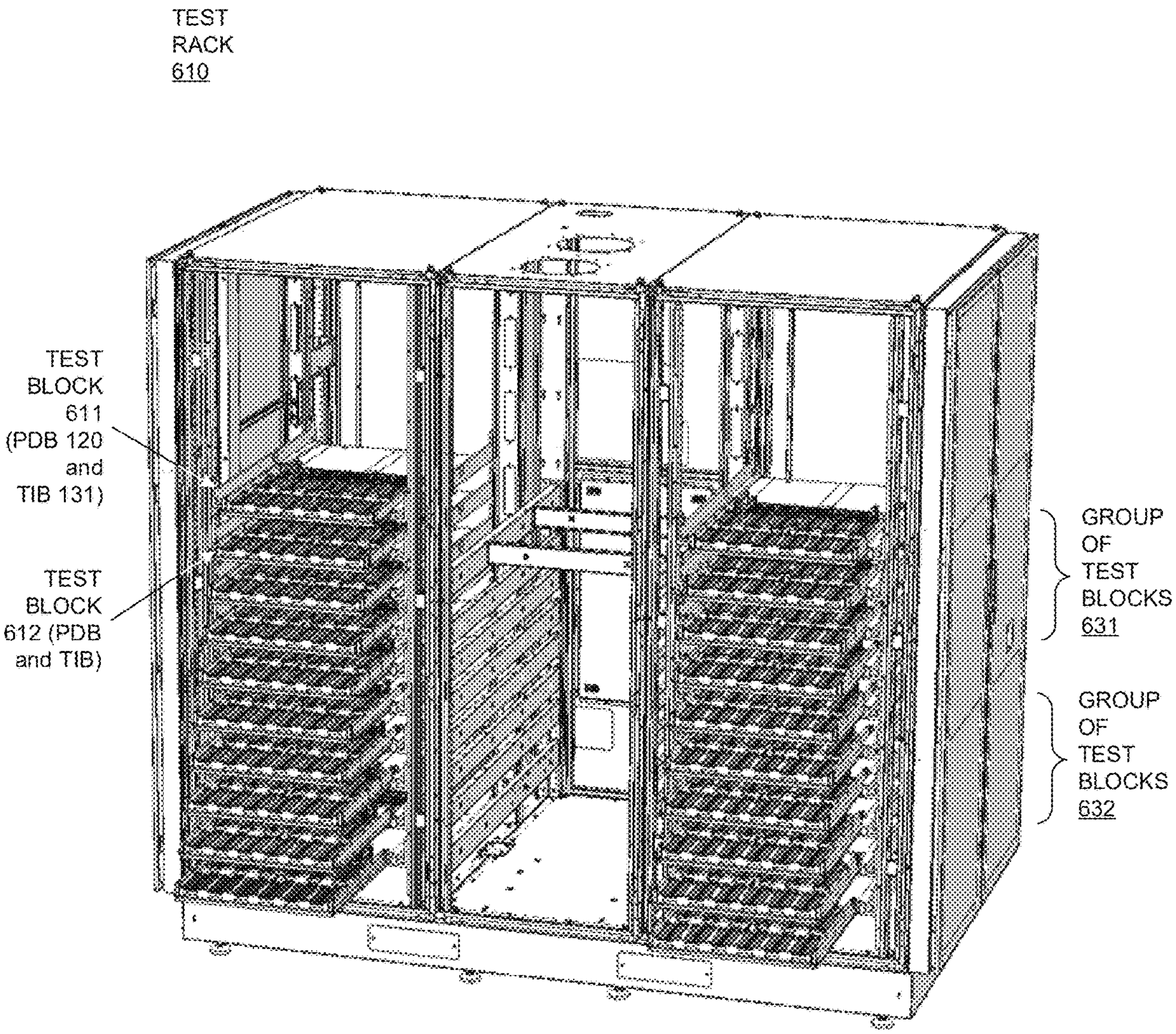
FIG. 6B illustrates an example of selected elements in a test rack in embodiments according to the present invention.

FIGS. 6A and 6B illustrate an example of selected elements in a test assembly (e.g., the test assembly 110 of FIGS. 1 and 5A-5D) in embodiments according to the present invention. Specifically, FIG. 6A illustrates an example of a PDB 120 and a TIB 131 in embodiments according to the present invention, and FIG. 6B illustrates an example of a test rack (or test chassis) 610 in embodiments according to the present invention. A pair of boards comprising a PDB and a TIB can be referred to as a test block.

In the example of FIG. 6A, the test block 611 includes the PDB 120 and the TIB 131. As previously described herein, the PDB 120 can include one or more computing units/SBCs, exemplified by the computing unit/SBC 121, and the TIB 131 can include one or more DUTs, exemplified by the DUT 141.

In the example of FIG. 6B, the test rack 610 includes a number of slots or some other means that support test blocks inside the test rack. The test assembly 110 (FIGS. 1 and 5A-5D) can include other test racks that are adjacent to or proximate to the test rack 610. In the example of FIG. 6B, the test rack 610 includes two test blocks 611 and 612; however, the present invention is not so limited, and the test rack can include any practical number of test blocks.

The computing units/SBCs in the test block 611 can be communicatively coupled to one or more of the DUTs in the TIB 131 and/or to one or more DUTs in any other TIB or test block in the test rack 610 or in another test rack (not shown) of the test assembly 110 (FIGS. 1 and 5A-5D) as previously described herein. Also, the DUTs in the test block 611 can be communicatively coupled to any computing unit/SBC on the PDB 120 or to any computing unit/SBC on any other PDB or test block in the test rack 610 or in another test rack of the test assembly 110 as previously described herein. The same can be said for the test block 612.

Multiple (e.g., two or more) test blocks can be grouped together to form a group of test blocks (e.g., test block groups 631 and 632 in FIG. 6B). The test blocks in a group of test blocks may be adjacent to each other in the test rack 610, but the invention is not so limited. Each test block, and also each group of test blocks, facilitates and enables device isolation and compartmentalization to ensure the integrity and security of the testing. More specifically, a test block, or a group of test blocks, can be communicatively coupled to a single or respective client system (e.g., the client system 101 or 102 of FIG. 1). Each client system can communicate only with the test block or group of test blocks that includes DUTs that belong to that client system. Thus, a client system (e.g., the client system 101) can provide respective test programs only to its own DUTs, and receive testing results only from its own DUTs, for example; and conversely, other client systems (e.g., the client system 102) cannot communicate with the DUTs, or receive test results from the DUTs, that belong to the client system 101. Consequently, each test block or group of test blocks can be tested independently in isolation, and communications between client systems and their respective DUTs is secure.

FIG. 7 is a flowchart 700 of an example of a method performed by a computing unit (cross-platform bridge) in a test assembly (e.g., the computing unit/SBC 121 in the test assembly 110 of FIG. 1) in embodiments according to the present invention. FIG. 8 is a flowchart 800 of an example of a method performed by a computing unit (cross-platform bridge) in a test assembly (e.g., the computing unit/SBC 121 in the test assembly 110 of FIG. 1) in embodiments according to the present invention. FIG. 9 is a flowchart 900 of an example of a method performed by a testing system (e.g., the testing system 100 of FIG. 1) in embodiments according to the present invention. FIGS. 7-9 are discussed with reference to the figures discussed above. The methods described in the examples of FIGS. 7-9 can be performed using possible combinations of the elements described in the preceding figures.

In block 702 of FIG. 7, a test program is received from an external system (e.g., from the intermediary device 106 or the client system 101 or 102). The test program is for testing DUTs (e.g., one or more of the DUTs 141-144) that are communicatively coupled to the computing unit and on one or more TIBs (e.g., the TIBs 131 and 132) of the test assembly 110. The TIBs are configured for connectivity to different types of devices having different form factors.

In block 704, the type of the DUT(s) is determined.

In block 706, a respective location on the test interface board(s) of each of the DUT(s) is determined.

In block 708, an operating system that is compatible with the DUT type is selected from a number of operating systems residing on and executable by the computing unit.

In block 710, commands for executing the test program are issued to each DUT using the selected operating system, and the test program is executed. In embodiments, context for executing the test program is also provided. In embodiments, a respective voltage level and a respective current level for testing components of each DUT are set by the computing device. In embodiments, a third-party framework is integrated into the test program and executed during the testing.

In block 712, results of the testing of the DUT(s) are received. In embodiments, the results are stored in a memory of the computing unit (e.g., the memory 204 of FIG. 2). In embodiments, the results of the testing are processed. In embodiments, the test results are analyzed while the testing is being performed, and the results of the analysis are used as feedback for another stage of the testing.

In block 714, the results of the testing are transmitted to the external system. In embodiments, a data package that includes a compilation of the results of the testing is generated, and the data package is sent to the external system.

In block 802 of FIG. 8, connections between DUT(s) (e.g., one or more of the DUTs 141-144) and one or more test interface boards (e.g., the TIBs 131 and 132) in a test rack (e.g., the test rack 610 of FIG. 6B) and that are communicatively coupled to the computing unit are detected. The DUTs in the test rack can include different types of devices having different form factors.

In block 804, a test program is accessed from a memory of the computing unit (e.g., the memory 204 of FIG. 2), where the test program is associated with a set of the DUTs. The set can include one or more of the DUTs 141-144.

In block 806, the test program is mapped to the locations in the test rack of each DUT of the set of DUT(s).

In block 808, an operating system is selected from a number of operating systems residing in the memory of the computing unit, where the selected operating system is compatible with a type of device in the set of DUT(s).

In block 810, the test program is executed on each DUT in the set of DUT(s), using the operating system.

In block 902 of FIG. 9, a number of test programs are received at computing units (e.g., the computing units 121 and 122 of FIG. 1) on a power distribution board (e.g., the PDB 120) in a test assembly (e.g., the test assembly 110) of a testing system (e.g., the testing system 100). The test programs are for testing DUTs (e.g., the DUTs 141-144) in one or more test racks (e.g., the test rack 610 of FIG. 6B) of the testing system or test assembly. Each test program includes respective commands for testing a respective set of the DUTs.

In block 904, a first test program is mapped to locations in the test assembly of each DUT of a first set of DUT(s), where the first set of DUT(s) is associated with the first test program and uses a first operating system.

In block 906, a second test program is mapped to locations in the test assembly of each DUT of a second set of DUT(s), where the second set of DUT(s) is associated with the second test program and uses a second operating system that is different from the first operating system.

In some implementations, the test assembly includes a number of test interface boards, the first set of DUT(s) is connected to a first test interface board in the test assembly, and the second set of DUT(s) is connected to a second test interface board in the test assembly. In other implementations, the first set of DUT(s) and the second set of DUT(s) are connected to the same test interface board. In some implementations, the first and second test interface boards are in the same test rack. In some implementations, the first and second test interface boards are in different test racks in the test assembly.

In block 908, the first test program is executed on each DUT in the first set of DUT(s), using the first operating system.

In block 910, the second test program is executed on each DUT in the second set of DUT(s), using the second operating system, where the second test program is executed concurrently with the execution of the first test program. In embodiments, the first test program and the second test program are executed concurrently by the same computing unit.

In block 912, results of testing the first set of DUT(s) are transmitted to a first client system.

In block 914, results of testing the second set of DUT(s) are transmitted to a second client system.

In sum, the disclosed techniques overcome the limitations of traditional systems and methods by introducing a cross-platform bridge (e.g., a computing unit or multiple computing units) that acts as an overall test orchestrator and can perform various functions across multiple platforms (e.g., operating systems) and DUT types. Different types of DUT can be tested without having to change the tester ecosystem. Furthermore, seamless two-way communication with the hardware, bare metal, and firmware of DUTs is simplified. The cross-platform bridge is designed to operate properly on different, perhaps any, platform or device, regardless of the specific hardware used by the platform or device.

At least one technical advantage of embodiments according to the present invention is that a single computing unit/SBC or cross-platform bridge has the capability to provide seamless two-way communication between a client (or customer) ecosystem and a vendor (or tester) ecosystem. Both ecosystems can seamlessly communicate with the other without full knowledge of the details of how the other ecosystem operates. Each computing unit/SBC also has the capability to communicate with and control different types of DUTs, and thereby has the ability to test a variety of devices at the same time without the need for a tester ecosystem that is dedicated to any one particular type of device. Each computing unit/SBC facilitates the practice of device isolation to ensure the integrity and security of the testing.

Other technical advantages provided by embodiments according to the present invention include the capability to run the same tests that are run on SLT chips on the DUTs, the capability to perform stress testing and connectivity testing in an integrated ecosystem, and the capability to perform advanced debugging test sessions on the DUTs while digital and connectivity tests are running in parallel on multiple different DUTs.

Clause 1. In some embodiments, a computing unit comprises: a first communications interface operable for receiving, from an external system communicatively coupled to the computing unit, a plurality of test programs for testing a plurality of devices that are communicatively coupled to the computing unit; a second communications interface operable for: transmitting commands for executing the plurality of test programs to the plurality of devices, and receiving results of the testing from the plurality of devices, wherein the first communications interface is also operable for transmitting the results of the testing to the external system; and a processor coupled to the first communications interface and to the second communications interface, wherein the processor is operable for: determining a device type for a set of devices comprising one or more devices of the plurality of devices; associating a test program of the plurality of test programs with the set of devices; and issuing commands for executing the test program to each device in the set using an operating system that is compatible with the device type.

Clause 2. The computing unit of clause 1, wherein the plurality of devices is coupled to a test interface board in a test rack and comprises different types of devices having different form factors.

Clause 3. The computing unit of any of clauses 1 and 2, operable for determining a respective location on a test interface board of said each device in the set.

Clause 4. The computing unit of any of clauses 1-3, configured to execute a plurality of different operating systems.

Clause 5. The computing unit of any of clauses 1-4, wherein: the computing unit comprises a single board computer comprising a processor and memory, and operable for using different communication protocols; the first communications interface comprises an Ethernet driver; the second communications interface is selected from a group consisting of: a Universal Serial Bus universal connector, an asynchronous receiver/transmitter connector, and a Peripheral Component Interconnect Express connector; and the external system is a computer system selected from the group consisting of: a proxy server and a client system.

Clause 6. The computing unit of any of clauses 1-5, operable for: generating a data package comprising a compilation of the results of testing said each device in the set, and sending the data package to the external system via the first communications interface.

Clause 7. The computing unit of any of clauses 1-6, wherein the testing is a type of testing selected from the group consisting of: system level testing; functional testing; and scan testing.

Clause 8. The computing unit of any of clauses 1-7, further comprising memory coupled to the processor, wherein the memory is operable for storing the results of testing said each device in the set.

Clause 9. The computing unit of any of clauses 1-8, wherein the processor is further operable for processing the results of testing said each device in the set.

Clause 10. In some embodiments, a test assembly comprises: a test interface board comprising a plurality of connection interfaces, wherein each connection interface of the plurality of connection interfaces is configured for connectivity to a respective device under test (DUT) of a plurality of DUTs; and a power distribution board coupled to a plurality of computing units, wherein each computing unit of the plurality of computing units is configured for connectivity to a respective set of DUTs comprising one or more DUTs of the plurality of DUTs, and wherein said each computing unit is operable for: determining a type of the DUTs in the respective set of DUTs; selecting an operating system of a plurality of operating systems, wherein the operating system is compatible with the type of the DUTs in the respective set of DUTs; and executing a test program on each DUT in the respective set of DUTs using the operating system.

Clause 11. The test assembly of clause 10, wherein said each computing unit is further operable for determining a location, on the test interface board, of said each DUT in the respective set of DUTs.

Clause 12. The test assembly of any of clauses 10 and 11, wherein said each computing unit comprises: a single board computer comprising a processor and memory, and operable for using different communication protocols; a first communications interface coupled to the processor and comprising an Ethernet driver operable for communicating with an external system; and a second communications interface coupled to the processor and operable for communicating with the respective set of DUTs, and comprising a connector selected from the group consisting of: a Universal Serial Bus universal connector, an asynchronous receiver/transmitter connector, and a Peripheral Component Interconnect Express connector.

Clause 13. The test assembly of any of clauses 10-12, wherein the plurality of DUTs connected to the test interface board comprises different types of devices having different form factors.

Clause 14. The test assembly of any of clauses 10-13, wherein said each computing unit comprises: memory; a processor coupled to the memory and operable for generating a data package comprising a compilation of results of testing said each DUT in the respective set of DUTs; and a communications interface coupled to the processor and operable for sending the data package to an external system.

Clause 15. The test assembly of any of clauses 10-13, wherein said each computing unit comprises: memory operable for storing results of testing said each DUT in the respective set of DUTs; and a processor coupled to the memory and operable for processing results of testing said each DUT in the respective set of DUTs.

Clause 16. In some embodiments, a system comprises: a test assembly comprising: a test interface board comprising a plurality of connection interfaces, wherein each connection interface of the plurality of connection interfaces is configured to connect to a respective device under test (DUT) of a plurality of DUTs; and a plurality of computing units coupled to a power distribution board; and an intermediary device coupled to the test assembly and operable for providing remote access to the plurality of computing units; wherein a computing unit of the plurality of computing units comprises a cross-platform bridge that is configured for connectivity to a set of DUTs comprising one or more DUTs associated with a client system, and wherein the computing unit is operable for: executing a plurality of different operating systems; identifying locations on the test interface board of each DUT of the set of DUTs; determining a type of DUT in the set of DUTs; receiving, from the client system via the intermediary device, a test program comprising a plurality of commands for testing the set of DUTs; executing the test program using an operating system of the plurality of different operating systems, wherein the operating system is compatible with the type of DUT in the set of DUTs; and transmitting results of the testing to the client system via the intermediary device.

Clause 17. The system of clause 16, wherein the computing unit comprises: a single board computer comprising a processor and memory, and operable for using different communication protocols; a first communications interface coupled to the processor and comprising an Ethernet driver operable for communicating with the intermediary device; and a second communications interface coupled to the processor and comprising a connector selected from the group consisting of: a Universal Serial Bus universal connector, an asynchronous receiver/transmitter connector, and a Peripheral Component Interconnect Express connector.

Clause 18. The system of any of clauses 16 and 17, wherein the plurality of DUTs connected to the test interface board comprises different types of devices having different form factors.

Clause 19. The system of any of clauses 16-18, wherein the test assembly further comprises a test rack configured to support one or more test interface boards including the test interface board, wherein each test interface board of the one or more test interface boards is configurable for different types of DUTs having different form factors.

Clause 20. The system of any of clauses 16-19, wherein the test assembly further comprises a test rack comprising the test interface board and a second test interface board, wherein the connection interfaces of the test interface board are configured for connectivity to a first type of DUT and wherein connection interfaces of the second test interface board are configured for connectivity to a second type of DUT, wherein further the first type of DUT has a form factor that is different from the second type.

Clause 21. In some embodiments, a method executed by a computing unit in a test assembly comprises: receiving, from an external system operable for communication with the computing unit, a test program for testing a plurality of devices communicatively coupled to the computing unit and to one or more test interface boards of the test assembly; determining a device type for the plurality of devices; determining a respective location, in the one or more test interface boards, of each device of the plurality of devices; selecting an operating system that is compatible with the device type, wherein the computing unit is configured to execute a plurality of different operating systems; issuing commands for executing the test program to said each device using the operating system that is selected; receiving results of the testing of the plurality of devices; and transmitting the results of the testing to the external system.

Clause 22. The method of clause 21, wherein the one or more test interface boards are configured for connectivity to different types of devices having different form factors.

Clause 23. The method of any of clauses 21 and 22, further comprising providing context for executing the test program.

Clause 24. The method of any of clauses 21-23, wherein: the computing unit comprises: a single board computer comprising a processor and memory, and operable for using different communication protocols; a first communications interface that receives the plurality of test programs from the external system and that transmits the results of the testing to the external system; and a second communications interface that transmits the commands to said each device and that receives the results of the testing; and the external system is a computer system selected from the group consisting of: a proxy server and a client system.

Clause 25. The method of any of clauses 21-24, further comprising: generating a data package comprising a compilation of the results of the testing of said each device; and sending the data package to the external system via the first communications interface.

Clause 26. The method of any of clauses 21-25, further comprising storing the results of the testing of said each device in a memory of the computing unit.

Clause 27. The method of any of clauses 21-26, further comprising processing the results of the testing of said each device.

Clause 28. The method of any of clauses 21-27, further comprising setting a respective voltage level and a respective current level for testing components of said each device.

Clause 29. The method of any of clauses 21-28, further comprising: analyzing the test results while the testing is being performed; and using the results of said analyzing as feedback for a next stage of the testing.

Clause 30. The method of any of clauses 21-29, further comprising integrating a third-party framework into the testing.

Clause 31. In some embodiments, a method executed by a computing unit connected to a power distribution board in a test assembly comprises: detecting connections between a plurality of devices under test (DUTs) and one or more test interface boards that are in a test rack and are communicatively coupled to the computing unit; accessing a test program from a memory of the computing unit, wherein the test program is associated with a set of DUTs of the plurality of DUTs; mapping the test program to locations in the test rack of each DUT of the set of DUTs; selecting an operating system of a plurality of operating systems residing in the memory of the computing unit, wherein the operating system is compatible with a type of device in the set of DUTs; and executing the test program on said each DUT in the set of DUTs using the operating system.

Clause 32. The method of clause 31, wherein the plurality of DUTs in the test rack comprises different types of devices having different form factors, and wherein the method further comprises determining the type of device in the set of DUTs.

Clause 33. The method of any of clauses of 31 and 32, further comprising providing context for said executing the test program.

Clause 34. The method of any of clauses 31-33, further comprising: receiving results of testing the set of DUTs; and storing the results in the memory of the computing unit.

Clause 35. The method of any of clauses 31-34, further comprising: receiving results of testing the set of DUTs; and processing, by a processor of the computer unit, the results.

Clause 36. In some embodiments, a method executed in a testing system comprising a plurality of computing units coupled to a power distribution board comprises: receiving, at the plurality of computing units, from a plurality of client systems communicatively coupled to the testing system, a plurality of test programs for testing a plurality of devices under test (DUTs) in one or more test racks in a test assembly of the testing system, wherein each test program of the plurality of test programs comprises respective commands for testing a respective set of DUTs of the plurality of DUTs; mapping a first test program of the plurality of test programs to locations in the test assembly of each DUT of a first set of DUTs of the plurality of DUTs, wherein the first set of DUTs is associated with the first test program and use a first operating system; mapping a second test program of the plurality of test programs to locations in the test assembly of each DUT of a second set of DUTs of the plurality of DUTs, wherein the second set of DUTs is associated with the second test program and use a second operating system that is different from the first operating system; executing the first test program on said each DUT in the first set of DUTs using the first operating system; executing the second test program on said each DUT in the second set of DUTs using the second operating system, wherein said executing the second test program is concurrent with said executing the first test program; transmitting results of testing the first set of DUTs to a first client system of the plurality of client systems; and transmitting results of testing the second set of DUTs to a second client system of the plurality of client systems.

Clause 37. The method of clause 36, wherein each computing unit of the plurality of computing units comprises: a single board computer comprising a processor and memory, and operable for using different communication protocols; a first communications interface coupled to the processor and operable for communicating with an intermediary device communicatively coupled to the first client system and communicatively coupled to the second client system; and a second communications interface coupled to the processor and operable for communicating with one or more DUTs of the plurality of DUTs.

Clause 38. The method of any of clauses 36 and 37, wherein the test assembly comprises a plurality of test interface boards, wherein the first set of DUTs is connected to a first test interface board of the plurality of test interface boards, and wherein the second set of DUTs is connected to a second test interface board of the plurality of test interface boards.

Clause 39. The method of clauses 36 and 37, wherein the test assembly comprises a plurality of test interface boards, wherein the first set of DUTs and the second set of DUTs are connected to a same test interface board of the plurality of test interface boards.

Clause 40. The method of any of clauses 36-39, wherein the first set of DUTs and the second set of DUTs are both communicatively coupled to a same computing unit of the plurality of computing units coupled to the power distribution board, and wherein said executing the first test program and said executing the second test program are performed concurrently by the same computing unit.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer-readable medium(s) having computer-readable program code embodied thereon.

Any combination of one or more computer-readable medium or media may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, RAM, ROM, EPROM, flash memory, an optical fiber, CD-ROM, a DVD, an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computing unit, comprising:

a first communications interface operable for receiving, from an external system communicatively coupled to the computing unit, a plurality of test programs for testing a plurality of devices that are communicatively coupled to the computing unit;

a second communications interface operable for: transmitting commands for executing the plurality of test programs to the plurality of devices, and receiving results of the testing from the plurality of devices, wherein the first communications interface is also operable for transmitting the results of the testing to the external system; and a processor coupled to the first communications interface and to the second communications interface, wherein the processor is operable for: determining a device type for a set of devices comprising one or more devices of the plurality of devices; associating a test program of the plurality of test programs with the set of devices; and issuing commands for executing the test program to each device in the set using an operating system that is compatible with the device type, wherein the plurality of devices are coupled to one of: a first test interface board disposed in a test rack; and a second test interface board disposed in the test rack, wherein the first test interface board is configured for connectivity to a first type of device, wherein the second test interface board is configured for connectivity to a second type of device, and wherein further the first type of device has a form factor that is different from the second type of device.

2. The computing unit of claim 1, operable for determining a respective location in a test interface board of said each device in the set.

3. The computing unit of claim 1, configured to execute a plurality of different operating systems, wherein the processor is further operable for: identifying and selecting an operating system used by the set of devices, executing the test program using the operating system that is selected, and providing context for said executing.

4. The computing unit of claim 1, wherein:

the computing unit comprises a single board computer comprising a processor and memory, and operable for using different communication protocols;

the first communications interface comprises an Ethernet driver;

the second communications interface is selected from a group consisting of: a Universal Serial Bus universal connector, an asynchronous receiver/transmitter connector, and a Peripheral Component Interconnect Express connector; and the external system is a computer system selected from the group consisting of: a proxy server and a client system.

5. The computing unit of claim 1, operable for: generating a data package comprising a compilation of the results of testing said each device in the set, and sending the data package to the external system via the first communications interface.

6. The computing unit of claim 1, wherein the testing is a type of testing selected from a group consisting of: system level testing; functional testing; and scan testing.

7. The computing unit of claim 1, further comprising memory coupled to the processor; wherein the memory is operable for storing the results of testing said each device in the set.

8. The computing unit of claim 1, wherein the processor is further operable for processing the results of testing said each device in the set.

9. A test assembly, comprising:

a first test interface board and a second test interface board disposed in a test rack; and a power distribution board coupled to a plurality of computing units, wherein each computing unit of the plurality of computing units is configured for connectivity to a respective set of DUTs comprising one or more DUTs of a plurality of DUTs, and wherein said each computing unit is operable for: determining a type of the DUTs in the respective set of DUTs; selecting an operating system of a plurality of operating systems, wherein the operating system is compatible with the type of the DUTs in the respective set of DUTs; and executing a test program on each DUT in the respective set of DUTs using the operating system, wherein the plurality of computing units are coupled to one of: the first test interface board; and the second test interface board, wherein the first test interface board is configured for connectivity to a first type of DUT, wherein the second test interface board is configured for connectivity to a second type of DUT, and wherein further the first type of DUT has a form factor that is different from the second type of DUT.

10. The test assembly of claim 9, wherein said each computing unit is further operable for determining a location, in the test interface board, of said each DUT in the respective set of DUTs.

11. The test assembly of claim 9, wherein said each computing unit comprises a connector selected from a group consisting of: a Universal Serial Bus universal connector, an asynchronous receiver/transmitter connector, and a Peripheral Component Interconnect Express connector.

12. The test assembly of claim 9, wherein said each computing unit comprises:

memory;

a processor coupled to the memory and operable for generating a data package comprising a compilation of results of testing said each DUT in the respective set of DUTs; and a communications interface coupled to the processor and operable for sending the data package to an external system.

13. The test assembly of claim 9, wherein said each computing unit comprises:

memory operable for storing results of testing said each DUT in the respective set of DUTs; and a processor coupled to the memory and operable for processing results of testing said each DUT in the respective set of DUTs.

14. A system, comprising:

a test assembly comprising:

a test interface board comprising a plurality of connection interfaces, wherein each connection interface of the plurality of connection interfaces is configured to connect to a respective device under test (DUT) of a plurality of DUTs; and a plurality of computing units coupled to a power distribution board; and an intermediary device coupled to the test assembly and operable for providing remote access to the plurality of computing units;

wherein a computing unit of the plurality of computing units comprises a cross-platform bridge that is configured for connectivity to a set of DUTs comprising one or more DUTs associated with a client system, and wherein the computing unit is operable for: executing a plurality of different operating systems; identifying locations on the test interface board of each DUT of the set of DUTs; determining a type of DUT in the set of DUTs; receiving, from the client system via the intermediary device, a test program comprising a plurality of commands for testing the set of DUTs; executing the test program using an operating system of the plurality of different operating systems, wherein the operating system is compatible with the type of DUT in the set of DUTs; and transmitting results of the testing to the client system via the intermediary device, wherein the test assembly further comprises a test rack comprising the test interface board and a second test interface board, wherein the connection interfaces of the test interface board are configured for connectivity to a first type of DUT and wherein connection interfaces of the second test interface board are configured for connectivity to a second type of DUT, wherein further the first type of DUT has a form factor that is different from the second type.

15. The system of claim 14, wherein the computing unit comprises:

a single board computer comprising a processor and memory, and operable for using different communication protocols;

a first communications interface coupled to the processor and comprising an Ethernet driver operable for communicating with the intermediary device; and a second communications interface coupled to the processor and comprising a connector selected from the group consisting of: a Universal Serial Bus universal connector, an asynchronous receiver/transmitter connector, and a Peripheral Component Interconnect Express connector.

16. The system of claim 14, wherein the plurality of DUTs connected to the test interface board comprises different types of devices having different form factors.

17. The system of claim 14, wherein the test assembly further comprises a test rack configured to support one or more test interface boards including the test interface board, wherein each test interface board of the one or more test interface boards is configurable for different types of DUTs having different form factors.

* * * * *